(12) United States Patent
Schroll et al.

(10) Patent No.: US 8,672,062 B2
(45) Date of Patent: Mar. 18, 2014

(54) INTERNAL MEANS FOR ROTATING AN OBJECT BETWEEN GRAVITATIONALLY STABLE STATES

(76) Inventors: Gregory C Schroll, Highlands Ranch, CO (US); Kenneth R Schroll, Highlands Ranch, CO (US)

( * ) Notice: Subject to any disclaimer, the term of this patent is extended or adjusted under 35 U.S.C. 154(b) by 0 days.

(21) Appl. No.: 13/480,579

(22) Filed: May 25, 2012

(65) Prior Publication Data
US 2012/0298430 A1 Nov. 29, 2012

Related U.S. Application Data

(60) Provisional application No. 61/490,332, filed on May 26, 2011.

(51) Int. Cl.
*B62D 51/06* (2006.01)
(52) U.S. Cl.
USPC .................. 180/8.1; 180/7.1; 280/5.2
(58) Field of Classification Search
USPC ............ 180/7.1, 21, 218, 9.32, 901; 280/5.2–5.32, DIG. 10
See application file for complete search history.

(56) References Cited

U.S. PATENT DOCUMENTS

| | | | |
|---|---|---|---|
| 1,548,442 A | 8/1925 | Chessin | |
| 3,231,036 A | 1/1966 | Appenrodt | |
| 3,452,948 A | 7/1969 | Kukel | |
| 3,762,226 A | 10/1973 | Davis | |
| 3,798,835 A * | 3/1974 | McKeehan | 446/442 |
| 5,054,331 A * | 10/1991 | Rodgers | 74/84 R |
| 6,227,933 B1 * | 5/2001 | Michaud et al. | 446/462 |
| 6,289,263 B1 | 9/2001 | Mukherjee | |
| 7,805,226 B2 | 9/2010 | Hamilton | |
| 2001/0032743 A1 * | 10/2001 | Kamen et al. | 180/7.1 |
| 2003/0019309 A1 * | 1/2003 | Tippett | 74/5.34 |
| 2004/0118231 A1 | 6/2004 | Peck | |
| 2005/0166691 A1 | 8/2005 | Hintz | |
| 2005/0242538 A1 | 11/2005 | Hiramatsu | |
| 2007/0257451 A1 | 11/2007 | Furuta | |
| 2008/0047375 A1 | 2/2008 | Sonoura | |
| 2008/0097644 A1 * | 4/2008 | Kaznov et al. | 700/245 |
| 2009/0001220 A1 | 1/2009 | Peck | |
| 2009/0183951 A1 | 7/2009 | Fiala | |
| 2009/0192674 A1 | 7/2009 | Simons | |
| 2010/0007303 A1 | 1/2010 | Chételat | |
| 2010/0044517 A1 | 2/2010 | Bialke | |
| 2010/0122859 A1 | 5/2010 | Schroll | |
| 2010/0140413 A1 | 6/2010 | Bailey | |
| 2010/0193265 A1 | 8/2010 | Furuta | |
| 2010/0198493 A1 | 8/2010 | Furuta | |
| 2011/0231013 A1 * | 9/2011 | Smoot et al. | 700/245 |
| 2012/0024633 A1 | 2/2012 | Vranish | |
| 2012/0291571 A1 * | 11/2012 | Peng et al. | 74/5.37 |

FOREIGN PATENT DOCUMENTS

| | | |
|---|---|---|
| EP | 2081829 B1 | 9/2010 |
| FR | 2947803 B1 | 7/2011 |
| GB | 2470961 A | 12/2010 |
| JP | 09175462 A | 7/1997 |

(Continued)

*Primary Examiner* — J. Allen Shriver, II
*Assistant Examiner* — Conan Duda
(74) *Attorney, Agent, or Firm* — Leyendecker & Lemire, LLC; Kurt Leyendecker

(57) ABSTRACT

A vehicle incorporating a plurality of control motion gyroscopes (CMTs) contained within a support structure is described. Optionally, a mass shifting mechanism may also be incorporated in the vehicle. The vehicle and its CMTs are configured to have a plurality of gravitationally stable states on a sloped surface.

14 Claims, 18 Drawing Sheets

(56) References Cited

FOREIGN PATENT DOCUMENTS

| JP | 2004009205 A | 1/2004 |
|---|---|---|
| JP | 2005080902 A | 3/2005 |
| JP | 2011116271 A | 6/2011 |
| JP | 2011246123 A | 12/2011 |
| WO | WO2005095891 A1 | 10/2005 |
| WO | WO2010027127 A1 | 3/2010 |
| WO | WO2011017668 A2 | 2/2011 |
| WO | WO2011152890 A2 | 12/2011 |

* cited by examiner

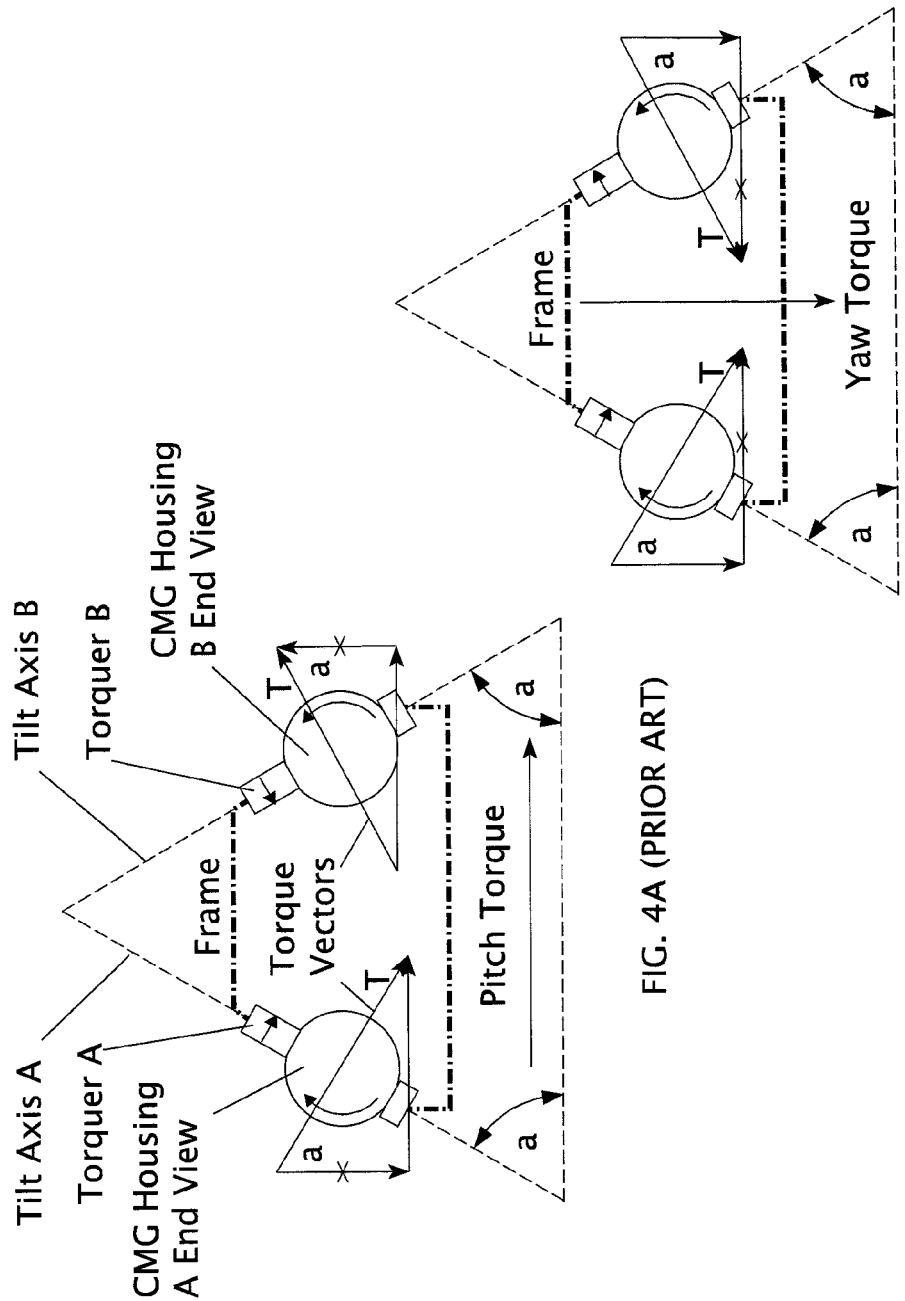

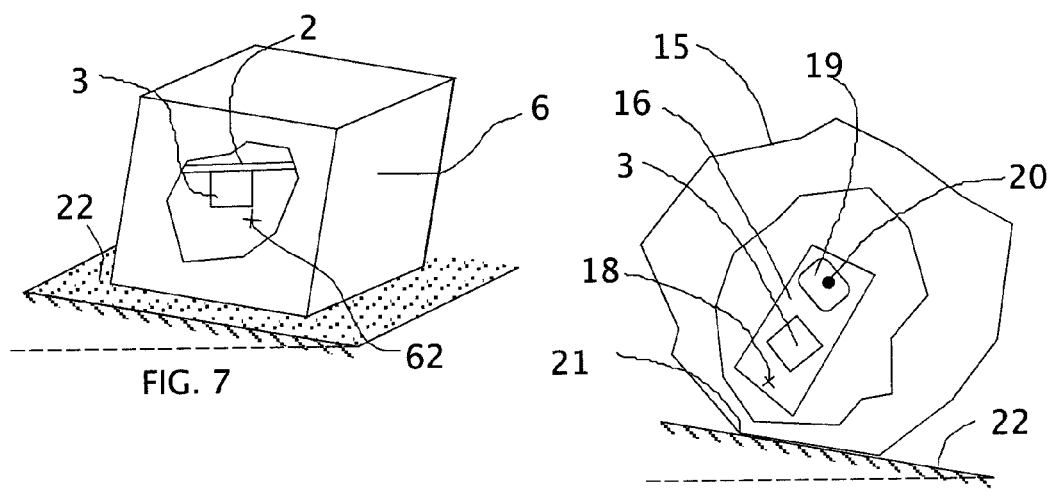
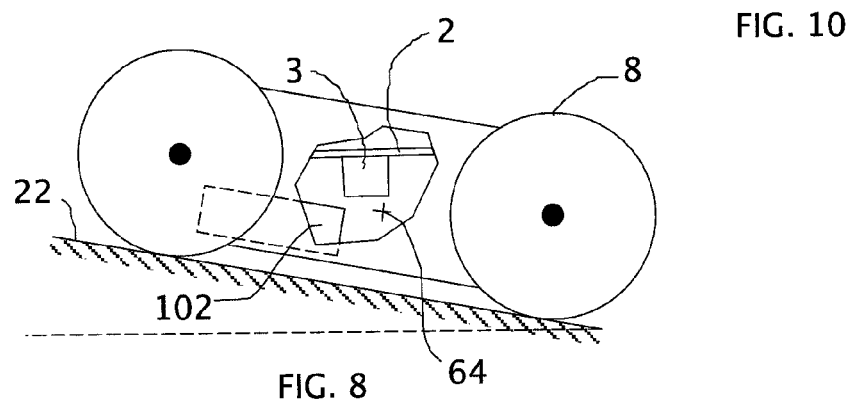
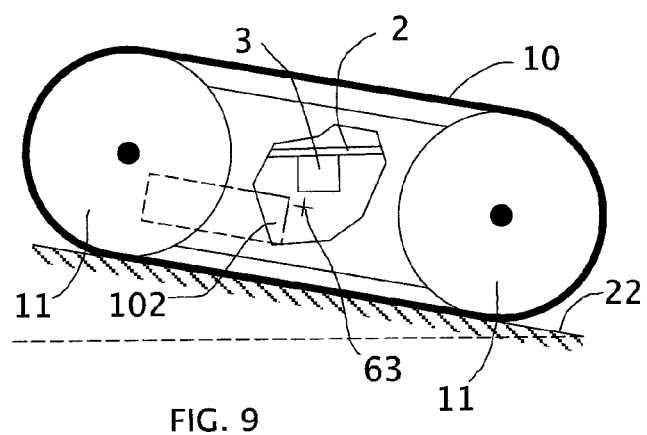

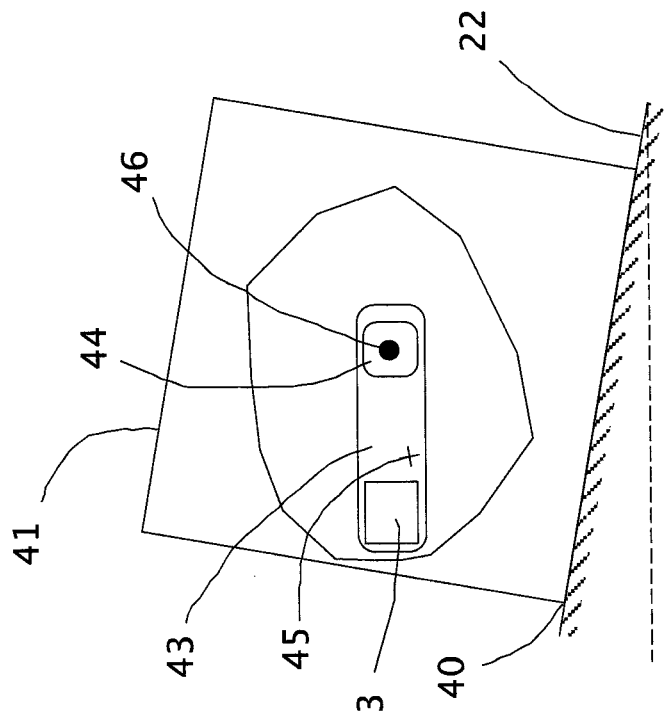
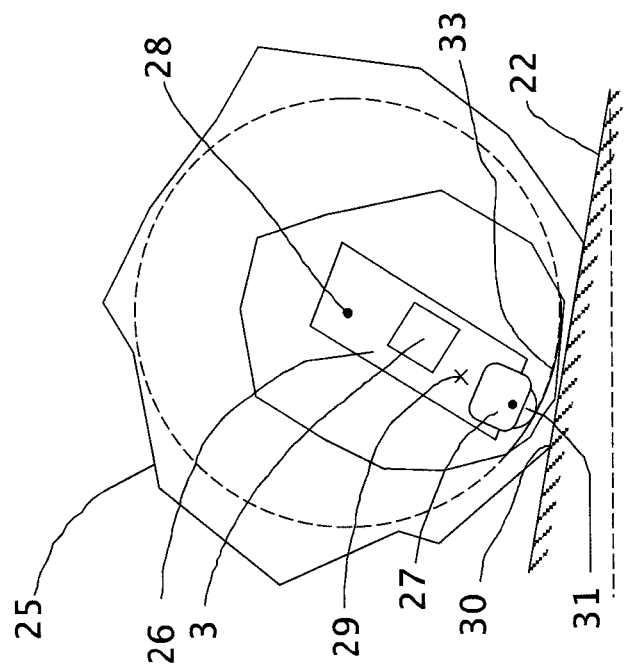
FIG. 12
FIG. 11

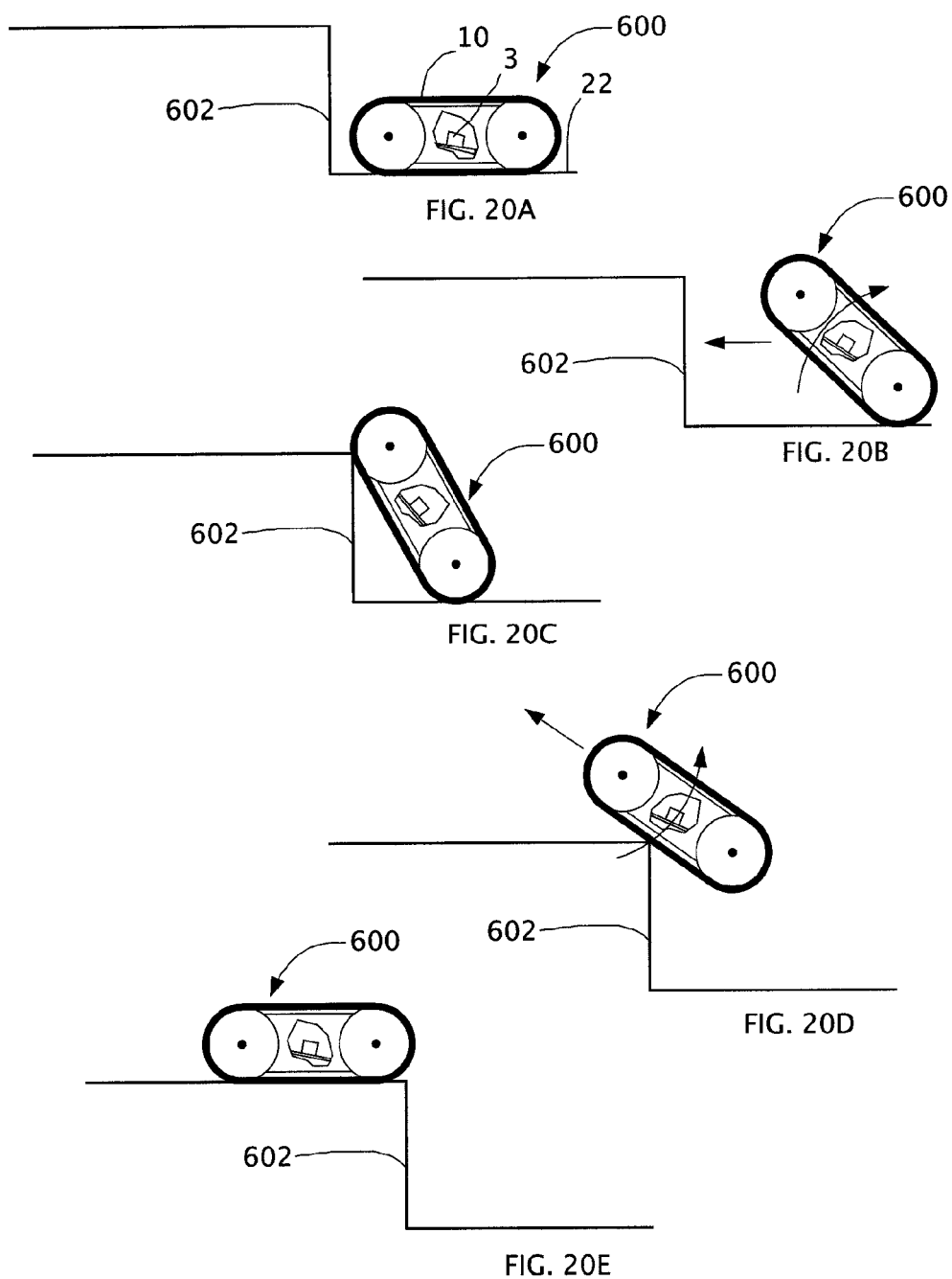

INTERNAL MEANS FOR ROTATING AN OBJECT BETWEEN GRAVITATIONALLY STABLE STATES

RELATED CASES

The present application claims the benefit of and priority to provisional patent application Ser. No. 61/490,332 for "Mobility Enhancement for Ground Vehicles" by Gregory Cordner Schroll and Kenneth Roy Schroll, filed on 26 May 2011, which provisional application is hereby incorporated by reference herein for all that it discloses and teaches. Pending U.S. patent application 12/619,582 filed on Nov. 16, 2009 having a common inventor is also hereby incorporated by reference.

FIELD OF THE INVENTION

The present invention relates generally to the use of stored angular momentum located within an object to overcome gravity torque acting on the object to effect rotation or pivotal movement of the object on an underlying support surface.

BACKGROUND

Numerous prior art solutions address the problem of improving the ability of robots and other vehicles to surmount obstacles and/or right themselves following a rollover accident. For example, US Patent Application US 2010/0139995 A1 "Mobile Robotic Vehicle" describes a tracked mobile robot featuring one or two articulated arms mounted external to the vehicle. These arms are rotatable about an axis located rearward of the center of gravity of the robot chassis and configured to trail the robot. The arms are actuated to effect endwise rollover of the vehicle by, for example, rotating to raise the rearward end of the robot and invert the robot endwise. In such prior art solutions involving external appendages, the employed locomotion mechanisms may be difficult to operate autonomously or by remote control, because the sequence of actions may not be easily performed autonomously or remotely by a human operator. The external arms are subject to snagging or fouling by debris or vegetation in the environment. Further, the arms may be prevented from moving towards a desired position to effectuate a particular maneuver by external obstacles in their paths.

In another prior art example, U.S. patent application No. US 2009/0192674 A1 discloses a hydraulically propelled, gyroscopically stabilized motor vehicle incorporating a double gimbal control moment gyroscope (CMG) said to prevent the vehicle from overturning. However, the US 2009/0192674 A1 prior art solution has serious deficiencies. The prevention of overturning is dynamically similar to rotating the vehicle from one gravitationally stable state (e.g., on its side) to another (upright). In the US 2009/0192674 A1 prior art, the CMG is an energy wheel comprising a wheel spinning in the horizontal plane, gimbaled in the pitch axis of the vehicle and gimbaled and elastically mounted in the roll axis. The wheel of the CMG is referred to as a gyroscopic wheel and is a conventional flywheel claimed to be capable of operating at the required rotational speed. The pitch axis gimbal is connected to the roll axis gimbal, i.e., the CMG is double gimbaled in the conventional sense. US 2009/0192674 A1 claims that the double gimbal CMG functions to prevent a vehicle rollover accident. This requires torque magnitude comparable to that required to effect rotation of the vehicle from lying on its side to an upright attitude, i.e., rotation from one gravitationally stable state to another. US 2009/0192674 A1 states that an object of the vehicle disclosed therein is to provide a standardized platform upon which any appropriately configured cargo, including a conventional passenger car body may be mounted. The weight and dimensions of any practical vehicle dictate that the torque required to prevent vehicle rollover must be relatively large, which places extremely challenging requirements on the CMG. As would be well known to those skilled in the art, the double gimbal CMG is a severely disadvantageous configuration for producing high levels of torque, because some part of the output torque of a double gimbal CMG must be balanced by the gimbal motors. This means that the output torque is limited by the motor torque limit—a very serious constraint in practice. An additional drawback to the US 2009/0192674 A1 prior art vehicle is the use of only one CMG. If the vehicle begins to rotate about its roll axis toward a rollover, the CMG rotor spin axis tilts about the vehicle pitch axis such that the CMG produces a roll torque component to resist the vehicle rollover. However, as the spin axis tilts, it also produces a yaw torque component, which may actually increase the rollover tendency if the vehicle is in a turn, or may otherwise contribute to vehicle instability.

International Application document WO 2011/017668 A2 discloses a spherical robot incorporating an internal cubical frame populated with four single-gimbal CMGs, with each gimbal axis at an angle on each face. The robot is not limited to spheres as an outer structure, but to all generalized amorphous ellipsoidal configurations as well, i.e., those having axially symmetric surfaces with circular cross sections. The CMGs may be operated individually or simultaneously to effect the desired function, such as rolling, steering, stationary rotation around the contact point or balancing in position. The angular momentum stored in the CMGs may be utilized to achieve rapid acceleration or deceleration in any direction. The center of mass of the robot is fixed to the center of the sphere.

The prior art spherical or amorphous ellipsoidal vehicle disclosed in WO 2011/017668 A2 is not capable of continuous uninterrupted travel in any particular direction, is not gravitationally stable on a sloped underlying surface, and its slope climbing capability is severely limited, for several reasons. A CMG produces output torque on a device by exchanging momentum with it. This momentum exchange is accomplished by tilting the CMG rotor spin axis at some angular rate. A CMG or system of CMGs has a maximum amount of angular momentum that can be stored or dispensed, dictated by their design and configuration. The CMGs cannot continuously produce output torque in a given direction, because the maximum stored momentum capacity will eventually be reached. Therefore, CMGs utilized to apply torque to drive a spherical vehicle must be periodically reset to or toward a net zero configuration by means of an external torque. Possible sources of external torque include a gravity-induced torque on an internal offset mass, or an external mechanism that can push off of the underlying surface. Since the CMG output torque magnitude is proportional to the product of the rotor angular momentum and the spin axis tilt rate, the CMGs must be returned to the net zero configuration slowly to avoid applying undesirably large torque opposite the desired direction. The prior art spherical or amorphous ellipsoidal vehicle disclosed in WO 2011/017668 A2 does not teach of any source of external torque for resetting the CMGs, since it lacks any external appendage, and the center of mass is strictly at the geometric center of the sphere. This means the vehicle can only generate a drive torque and accelerate in a given direction for a limited period of time before saturating the CMGs. With no way to effectively reset the CMGs back to a neutral state, the vehicle can now only generate torque and accelerate in the opposite direction. This vehicle oscillatory motion is a consequence of the conservation of momentum, and clearly illustrates one of the critical shortcomings of the WO 2011/017668 A2 prior art vehicle.

The fact that the center of mass is fixed at the geometric center of the WO 2011/017668 A2 prior art vehicle, plus the vehicle can only generate torque in a given direction for a limited time means that this vehicle cannot remain stationary on a slope for very long because there is no way to continuously counterbalance the gravity torque on the vehicle about the point of contact with the sloped surface.

A second serious deficiency of the prior art vehicle disclosed in WO 2011/017668 A2 arises from the fact that the center of mass is fixed at the center of the vehicle. This becomes a handicap when the vehicle is to surmount an obstacle such as a step, because the torque required to rotate the vehicle to surmount the obstacle is greater than if the vehicle center of mass could be shifted toward the obstacle to reduce the moment arm through which the vehicle weight acts. The required higher torque dictates that the CMG angular momentum be higher and/or that the rotor spin axis tilt rate be higher. These increased requirements mean the CMGs must be heavier or spin faster with consequently lower safety factor and/or that the tilt actuators be more powerful, and therefore heavier and more costly. The heavier CMGs increase the vehicle weight and therefore the CMG torque requirement.

U.S. patent application Ser. No. 12/619,582 discloses the use of a pair of CMGs to augment the drive torque produced by a pendulum mass-shifting drive system in a spherical vehicle. In the spherical vehicle disclosed in that application, the pair of CMGs produce a resultant torque about only a single axis parallel to the axis supporting the pendulum, such that they contribute to only forward and rearward propulsion of the vehicle. Steering of the disclosed spherical vehicle is provided by swinging the pendulum to one side while also swinging forward or rearward, causing the vehicle to travel in an arc to the left or right. A key feature of some embodiments of the present invention is the use of CMG-generated yaw torque for steering, i.e., changing the heading of the vehicle while stationary or while moving forward or backward. This eliminates the need to swing the pendulum to either side for steering, an approach requiring that the volume within the vehicle on either side of the pendulum be clear of any other components to allow for the sideward swing of the pendulum. An additional shortcoming of the Ser. No. 12/619,582 prior art vehicle is that it has only a single gravitationally stable state on a sloped underlying surface.

DESCRIPTION OF DRAWINGS

FIGS. 4A-4B shows a skewed-pair arrangement of two single gimbal CMGs configured to apply torque about either the roll axis or the pitch axis of a vehicle or other object as is known in the prior art.

FIGS. 5A-5C show the irregularly shaped device resting on a sloped surface in three different gravitationally stable orientations (states) according to one embodiment of the present invention.

FIGS. 6A-6C show the cylindrical device resting on a sloped surface in three different gravitationally stable orientations according to one embodiment of the present invention.

FIG. 7 is a cutaway view of an embodiment of the subject device having a multisided outer support surface and a plurality of single gimbal CMGs attached to a chassis element according to one embodiment of the present invention.

FIG. 8 is a cutaway view of an embodiment of the subject device including a driven outer support surface comprising a driven wheel, and further including a plurality of single gimbal CMGs attached to a chassis element according to one embodiment of the present invention.

FIG. 9 is a cutaway view of an embodiment of the subject device including a driven outer support surface comprising a flexible track trained over a pair of wheels, and further including a plurality of single gimbal CMGs attached to a chassis element according to one embodiment of the present invention.

FIG. 10 is a cutaway view of an embodiment of the subject device in which the plurality of single gimbal CMGs is mounted on a pendulum mass-shifting element, which is disposed to shift the location of the device center of gravity according to one embodiment of the present invention.

FIG. 11 is a cutaway view of an embodiment of the subject device in which the plurality of single gimbal CMGs is mounted on a hamster wheel mass-shifting element, which is disposed to shift the location of the center of gravity in a vehicle with an irregular outer surface according to one embodiment of the present invention.

FIG. 12 is a cutaway view of an embodiment of the subject device in which the plurality of single gimbal CMGs is mounted on a pendulum mass-shifting element, which is disposed to shift the location of the center of gravity in a cubical vehicle according to one embodiment of the present invention.

FIGS. 20A-20E illustrate a first method by which a tracked vehicle utilizing single gimbal CMG-generated torque can surmount a step according to one embodiment of the present invention.

DETAILED DESCRIPTION OF THE INVENTION

Figure 1:
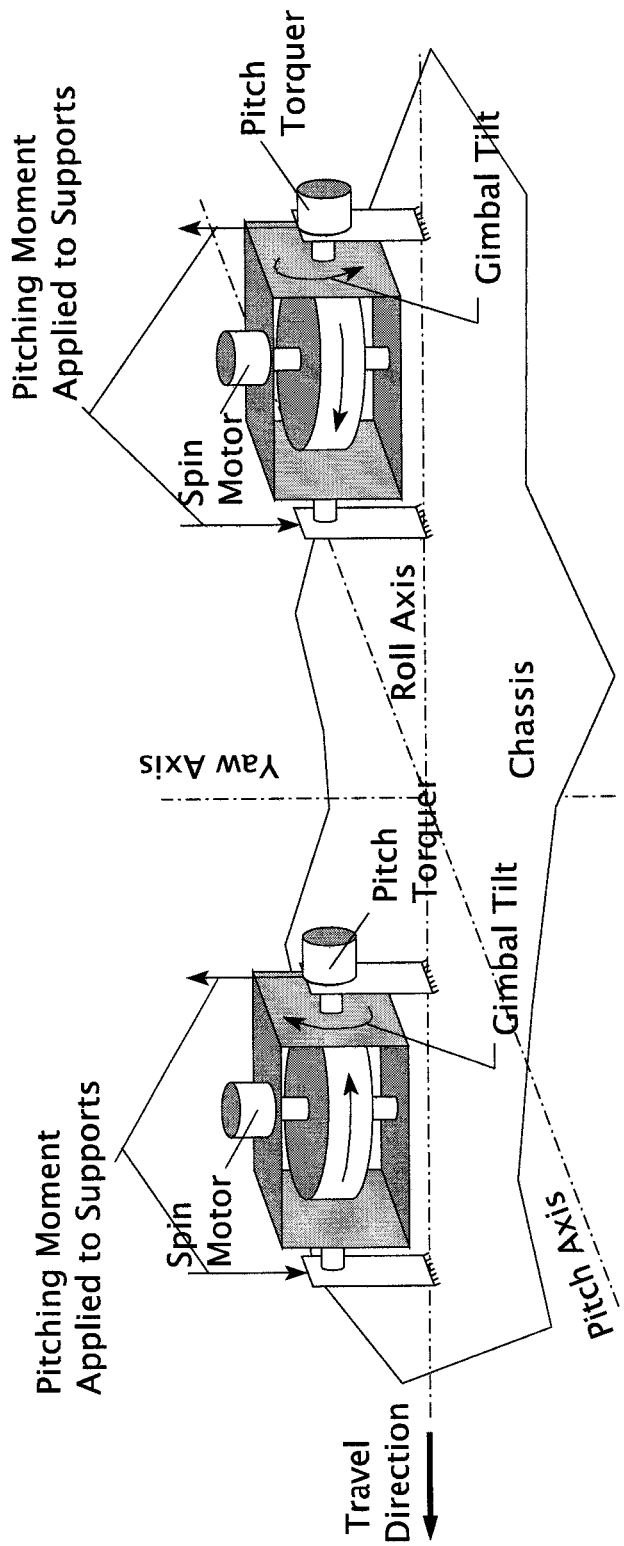
FIG. 1 is a perspective view of two single gimbal CMGs configured to apply torque about the pitch axis of a vehicle or other object as is known in the prior art.

Embodiments of the present invention comprise objects/devices that are configured for locomotion on ground surfaces. At least some embodiments have the ability to roll over or pivot on an underlying surface, including the ability to rotate from one gravitationally stable state to another on an underlying sloped surface, without the need to push against anything external to the embodiment. Objects exhibiting these characteristics have potential beneficial uses in a variety of civilian, military, law enforcement and entertainment applications. Concomitantly, the ability to be gravitationally stable (i.e., to rest indefinitely) on a sloped underlying surface in several different orientations also has many potential uses in many situations. In addition, when the embodiment is a ground vehicle, providing or enhancing the locomotion, rollover recovery and obstacle climbing ability by employing means completely internal to the vehicle is highly desirable in many applications wherein these capabilities help to both minimize the possibility of the vehicle being snagged or disabled, and facilitate sealing the vehicle envelope against the external environment.

At least one embodiment features a device including a center of gravity (also called center of mass) and an external support surface. The device includes a plurality of gravitationally stable states on both horizontal surfaces and sloped surfaces. The device further includes a plurality of single gimbal control moment gyroscopes (CMGs), disposed within the external support surface so as to apply their precession torques to the device, and arranged such that their spin vectors may be controllably and independently tilted. The CMGs are also arranged so that (i) there is a combination of tilt angles resulting in net zero angular momentum known as the neutral state and (ii) some or all of their spin vectors may be controllably tilted to produce a net resultant torque vector in a chosen direction, with magnitude sufficient to effect rotation of the object permitting movement of the device from one gravitationally stable state to another selectable gravitationally stable state on a horizontal or sloped underlying support surface.

In some embodiments, the plurality of CMGs are further arranged in a device such that some or all of the CMG spin vectors may be controllably tilted such that their precession torque vectors produce a resultant torque vector with magnitude sufficient to pivot the device in its current gravitationally stable state relative to the horizontal or sloped underlying support surface.

Embodiments can have a variety of different support surface configurations depending on the intended purpose of a particular device. For some, the device's outer support surface is irregular. With other embodiments, the outer support surface is multisided. In yet others, the support surface is substantially a surface of revolution.

Embodiments can include a variety of drive mechanisms to augment the propulsion of the device aside from the CMGs alone. In some embodiments, the device includes a driven support surface. The driven support surface may include one or more wheels which may be driven. In other embodiments, the driven support surface can include one or more flexible tracks trained about one or more pairs of wheels. In some embodiments, the driven support surface includes one or more driven legs. In yet other embodiments, the plurality of CMGs are mounted on a mass-shifting element, which is disposed to shift the location of the device center of gravity. In some embodiments, the mass-shifting element can comprise a pendulum mechanism disposed to apply torque to the device. In other embodiments, the mass-shifting element can comprise a hamster wheel drive mechanism disposed to apply torque to the device. In some embodiments, the driven support surface is configured to allow the device to pivot in its current gravitationally stable state relative to the horizontal or sloped underlying support surface. Further, embodiments incorporating suitable combinations of support surfaces and drive mechanisms are also known.

Embodiments of the present invention use torque produced by a plurality of onboard single gimbal CMGs to rotate the device from one gravitationally stable state to another selectable gravitationally stable state by overcoming the resisting gravity torque, to thereby enable many useful and novel movements and maneuvers. Repeated device rotation from one gravitationally stable state to another along the underlying surface results in travel or displacement of the device along the surface. Since all embodiments of the present invention are capable of carrying "things", they can effectively function as means of transport, commonly referred to as vehicles. Therefore, while the various embodiments of the present invention described herein are referred to most generally as devices, all the embodiments can function as a means of transport and may be correctly referred to as vehicles.

Briefly, embodiments of the present invention include utilizing internally generated angular momentum to apply torque to overcome gravity torque acting on an object to effect rotation of the object from one gravitationally stable state to another selectable gravitationally stable state, or to pivot the device in its current gravitationally stable state on a horizontal or sloped underlying support surface. Torque may be generated by gyroscopes about a desired axis by changing the direction of net angular momentum of the gyroscopes while leaving their magnitude unaffected. A gyroscope, including a flywheel (rotor), a housing and a drive motor, when tilted about an axis perpendicular to its spin axis, as described herein below, is commonly referred to as a control moment gyroscope (CMG).

Gyroscopic precession for CMGs is governed by the following equations:

$$\tau = dL/dt,$$

$$L = I\dot{v}, \text{ and}$$

$$E_{kinetic} = \frac{1}{2}I\dot{v}^2,$$

where $\tau$ is torque, L is the angular momentum, I is the moment of inertia, $\dot{v}$ is the angular velocity, and E is the kinetic energy. From the first of these equations, it is seen that torque is a function of the rate of change of the angular momentum, i.e., the rate at which the rotor spin vector is tilted. The angular momentum of a flywheel is a vector quantity and is a function of the moment of inertia of the flywheel and its angular velocity. The kinetic energy of the flywheel is a scalar quantity, and is a function of the moment of inertia and the square of the angular velocity. This leads to the effectiveness of a CMG for use in the present invention. A torque can be applied to change the direction of the angular momentum by tilting the spin vector, without changing the rotational kinetic energy. When rotating at high speeds, the flywheel in each of the CMGs stores a significant quantity of angular momentum and kinetic energy.

Figure 2:
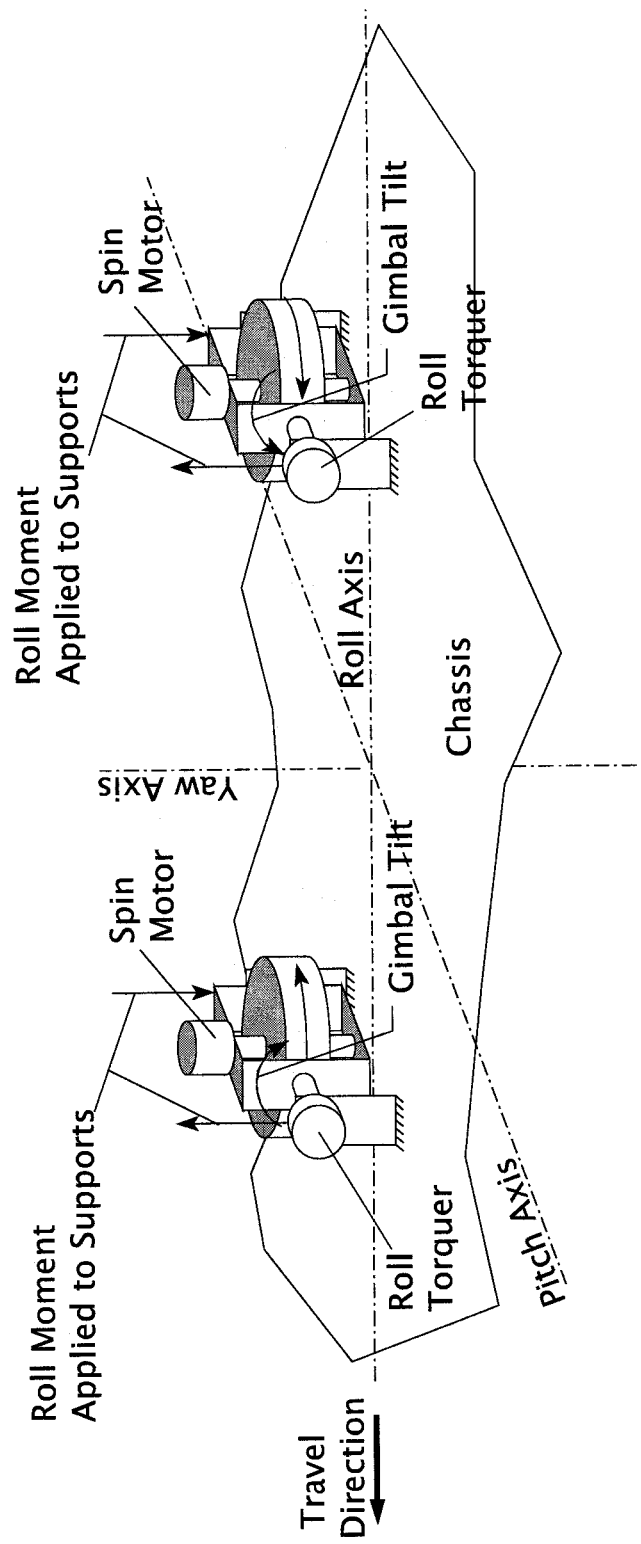
FIG. 2 is a perspective view of two single gimbal CMGs configured to apply torque about the roll axis of a vehicle or other object as is known in the prior art.

CMGs are advantageously used in one or more pairs. A pair of CMGs oriented such that their angular momentum (spin) vectors are parallel, equal in magnitude and pointed in opposite directions, results in zero net angular momentum for the pair, a configuration referred to hereinafter as the neutral state. When held in this net zero neutral state configuration relative to each other, the pair can change orientation as a unit relative to an inertial reference frame without generating adverse gyroscopic effects, which would otherwise occur if the net angular momentum were non-zero. If the CMGs are additionally configured so that the tilt vectors are parallel, the two CMG spin vectors can be tilted equally and in opposite directions to produce a resultant torque vector in a direction orthogonal to the spin and tilt vectors. This configuration is referred to herein as a "scissored-pair." For example, if the spin and tilt vectors are orthogonal to a vehicle's pitch axis, tilting the spin vectors equally and in opposite directions will apply pitching torque to the vehicle. FIG. 1 shows this particular arrangement. Similar arrangements of two CMGs could be used to produce roll and yaw torque on a vehicle. FIG. 2 shows a similar arrangement of two CMGs to produce torque about a vehicle roll axis.

The spin vectors of each CMG in a scissored-pair configuration can be tilted equally and oppositely through an angle up to 90 degrees from the neutral state orientation. The resultant output torque from the pair starts at a maximum at the neutral state and diminishes to zero at 90 degrees. If each CMG is tilted beyond 90 degrees, the output torque begins to increase in the opposite direction. Therefore, in the present invention, each spin vector must typically be tilted back to or toward the neutral state when its tilt angle approaches 90 degrees, before it can be used to produce additional torque in the same direction. This discontinuous or intermittent production of torque in a given direction must be taken into account in the operational use of CMGs.

Figure 3:
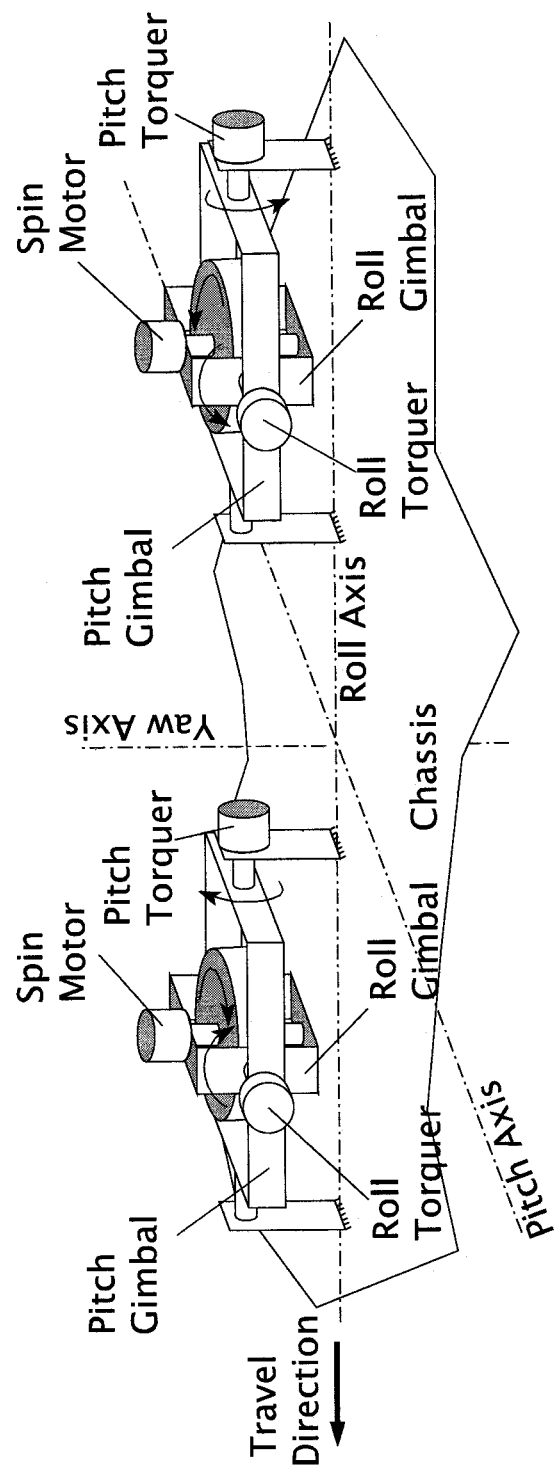
FIG. 3 is a perspective view of two double gimbal CMGs configured to apply torque about either the roll axis or the pitch axis of a vehicle or other object as is known in the prior art.

CMGs can be mounted in single or double gimbal arrangements. In the single gimbal arrangement, the flywheel with its drive motor can be tilted about a single axis orthogonal to the flywheel spin axis. In the double gimbal arrangement, the flywheel with its drive motor can be tilted about two mutually perpendicular axes, each orthogonal to the flywheel spin axis. The double gimbal CMG is more complex than a single gimbal CMG, but it can generate precession torque about two axes. A single gimbal CMG can produce more output torque than a double gimbal CMG, because the output torque of the single CMG appears on the flywheel and is transferred directly to the vehicle across the gimbal bearings. The output torque can be much larger than the gimbal motor torque required to drive the gimbal. This effect is known as "torque amplification". By contrast, some part of the output torque of a double gimbal CMG must be balanced by the gimbal motors. Therefore, in this case, the output torque is limited by the motor torque limit. FIG. 3 shows two double gimbal CMGs arranged to produce vehicle roll and pitch torques.

A useful alternative arrangement of a pair of CMGs is one in which the tilt vectors are not parallel. For example, if the two spin vectors are orthogonal to (for example) the vehicle's pitch axis, and the tilt vectors lie in a vertical plane, but are not parallel, when the spin vectors are tilted, both pitch and yaw torque vector components are produced. If the tilt rates are equal, but in opposite directions, the yaw components cancel out, and the pitch components add together. Conversely, if the tilts are in the same direction, the pitch components cancel out and the yaw components add together. Therefore, with this CMG arrangement, a single pair of CMGs can be employed to produce torques about two orthogonal axes. The tilt rates and directions can also be independently controlled to produce resultant torque about any vector orthogonal to the vehicle roll axis. This arrangement is referred to herein as a "skewed-pair." FIG. 4A shows a pair of CMGs arranged in this way, and illustrates that by tilting the two CMGs in opposite directions, a pitching torque may be produced, while the yaw vector components cancel out. FIG. 4B shows that by tilting the CMGs in the same direction, a yaw torque may be produced, while the pitching vector components cancel out. Employing a second similar pair of CMGs in which the spin axes are orthogonal to the roll axis can produce both roll and yaw torques. Two pairs of CMGs, mounted as just described, form what is known in the art as a pyramid arrangement. A pyramid arrangement employing two pairs of CMGs will exhibit a neutral state and be able to produce torques about a vehicle's roll, pitch and yaw axes, or any axis in between, by appropriately tilting the spin vectors.

Many different combinations and arrangements of single and double gimbal CMGs exhibiting a neutral state and capable of producing net precession torque about one or more axes are well known to those skilled in the art. As noted above, single gimbal CMGs can produce far more torque than double gimbal CMGs, but double gimbal CMGs can produce torques about multiple axes with fewer CMGs.

All of the embodiments of the present invention employ single gimbal CMGs, and the CMGs are arranged in a configuration capable of achieving a neutral state. In these embodiments, the size and weight of the CMGs are specified relative to the size and weight of the device so that the net CMG precession torque magnitude is sufficient to effect rotation of the device from one gravitationally stable state to another selectable gravitationally stable state on a horizontal or sloped underlying support surface. All of the embodiments of the present invention also include an internal means of using a gravity-induced torque to reset the CMGs to a neutral state. Embodiments with an outer support surface that is substantially a surface of revolution have an internal means of shifting the center of mass to create a gravity-induced torque. Embodiments with an irregular or multisided outer support surface can generate a gravity-induced torque about a pivot point between gravitationally stable states. In at least some of the embodiments, the net CMG precession torque magnitude is sufficient to overcome friction between the device and the horizontal or sloped underlying support surface so as to pivot the device in its current gravitationally stable state relative to the surface.

Definitions and Terminology:

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The term "CMG" is an abbreviation for "Controlled Moment Gyroscope" or "Control Moment Gyroscope" and refers to a device comprising a spinning rotor and one or more motorized gimbals that are configured to alter the orientation of the rotor and as such apply torque to an associated structure.

The phrase "hamster wheel" refers to a drive mechanism that typically comprises a hollow cylindrical wheel in which an internal mass engages with, moves within and climbs up the internal wheel surface thereby applying a torque to the wheel causing it to rotate.

The phrase "sloped surface" refers to a support surface that is inclined relative to horizontal. For purposes of the present embodiments and the appended claims, a sloped surface shall have a grade of greater than 0 degrees and less than 90 degrees. Relative to embodiments, the maximum sloped-surface inclination angle that a vehicle can climb or on which it can rest indefinitely is determined by the vehicle's external geometry and the location of the vehicle's center of gravity, both of which depend on the specific design.

The phrase "gravitationally stable state" refers to a state in which an embodiment of the present invention is in a stable equilibrium and capable of remaining stationary on a support surface absent the application of external forces while in the presence of a uniform gravitational field. At least some embodiments include gravitationally stable states on sloped surfaces. Some embodiments have gravitationally stable states on slopes of greater than 1 degree, preferably greater than 3 degrees, more preferably greater than 10 degrees and most preferably greater than 30 degrees.

A First Embodiment of the Present Invention

Figure 5A:
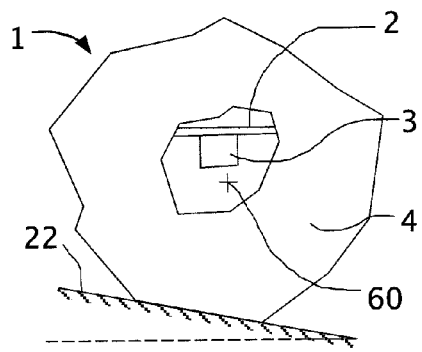
FIGS. 5A-5C show a cutaway view of an embodiment of the subject device having an irregular outer support surface and a plurality of single gimbal CMGs attached to a chassis element.
Figure 5B:
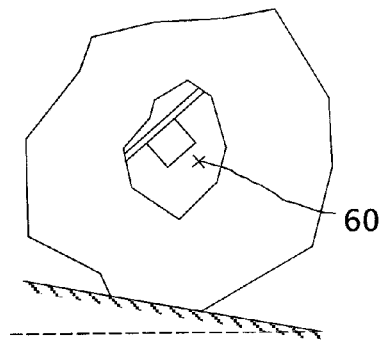
Figure 5C:
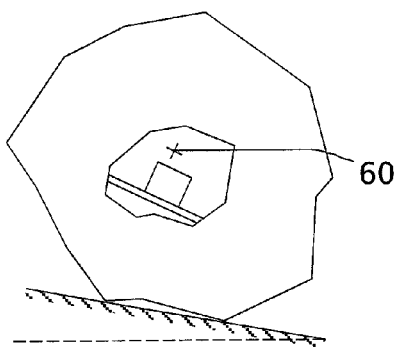

FIG. 5A-5C show a cutaway view of a first embodiment of the present invention consisting of a generic ground vehicle 1 illustrated at rest on sloped underlying support surface 22, having a chassis element 2 or similar internal vehicle element to which a plurality of single gimbal CMGs 3 is attached. Also attached to element 2 is an outer support surface 4. The vehicle has a location within it defining a center of gravity 60. The embodiment shown in FIGS. 5A-5C has an irregular outer support surface. Irregular outer support surface 4 is capable of providing a plurality of gravitationally stable states of vehicle 1 on the underlying support surface 22, of which three are illustrated in the figures. The spin vectors of the plurality of single gimbal CMGs 3 may be controllably and independently tilted so as to apply their precession torques to the vehicle. In the gravitationally stable state, the CMGs 3 are arranged such that there is a combination of tilt angles resulting in net zero angular momentum. When the CMGs are so arranged to produce no net angular momentum they are collectively in a neutral state. With the plurality of CMGs 3 held in the neutral state, the vehicle can change orientation as a unit relative to an inertial reference frame, such as through the use of another drive mechanism (not shown) without causing CMGs 3 to apply adverse gyroscopic torques on the vehicle.

The plurality of CMGs 3 are further arranged such that some or all of their spin vectors may be controllably tilted so that their precession torque vectors produce a resultant torque vector with magnitude sufficient to rotate vehicle 1 from one gravitationally stable state to another selectable gravitationally stable state.

As previously discussed, the CMGs 3 cannot continuously produce torque in a given direction, but must periodically be reset to or toward the neutral state. Due to this need to periodically reset the CMGs, the rollover motion of vehicle 1 described above cannot continue uninterrupted in a given direction when no additional drive mechanism is provided.

In some embodiments, plurality of CMGs 3 are further arranged such that some or all of the CMG spin vectors may be controllably tilted such that their precession torque vectors produce a resultant torque vector with magnitude sufficient to pivot vehicle 1 in its current gravitationally stable state relative to the underlying horizontal or sloped support surface to change its heading, i.e., for steering vehicle 1. The production of torque to pivot the vehicle in its current gravitationally stable state relative to underlying support surface 22 requires that plurality of CMGs 3 are collectively orientated to produce a torque having a magnitude large enough to overcome frictional torque between the vehicle and the underlying surface 22.

The embodiment shown in FIGS. 5A-5C, as well as the embodiments disclosed herein can incorporate a plurality of CMGs that are configured to produce resultant torques about a plurality of axes, as dictated by the needs of the application. For example, torque about a "pitch" axis may be employed to propel the vehicle forward and rearward, while torque about a "yaw" axis may be used to change heading. In addition, torque about a "roll" axis could be used for sideward locomotion or to right the vehicle if it rolls onto its side. However, if the vehicle rolls onto its side, what was originally the vehicle yaw axis effectively becomes the vehicle roll axis, and torque about that axis may be used to right the vehicle. While a three-axis CMG arrangement offers the greatest flexibility in movement options, a two-axis system is simpler and often less costly to produce.

A Second Embodiment of the Present Invention

Figure 6A:
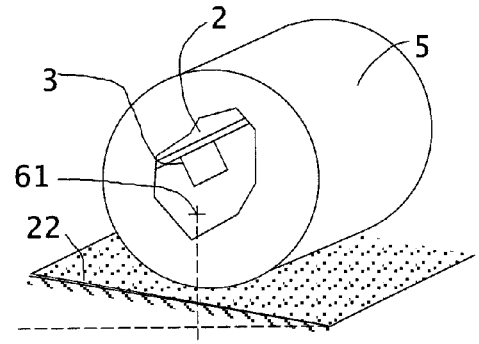
FIGS. 6A-6C show a cutaway view of an embodiment of the subject device having a substantially circular cylindrical outer support surface, substantially flat end faces, and a plurality of single gimbal CMGs attached to a chassis element.
Figure 6B:
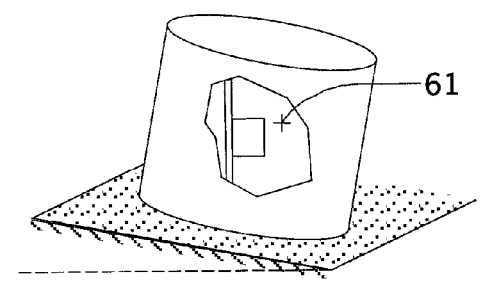
Figure 6C:
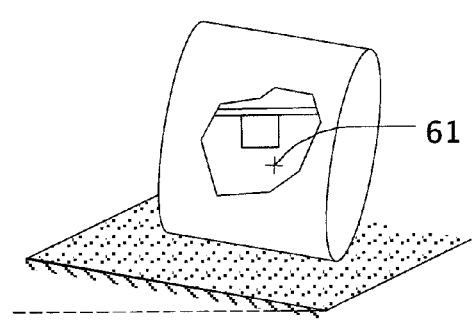

FIGS. 6A-6C show a cutaway view of a second embodiment of the present invention in which the vehicle is at rest on sloped underlying support surface 22 and has an outer support surface 5 that is a surface of revolution commonly known as a circular cylinder. Of note, as applicable similar features, elements or components presented in the various illustrated embodiments are given the same element numbers. If the vehicle center of mass of a circular cylindrical vehicle is located at the geometric center of the vehicle, the vehicle will have two gravitationally stable states when underlying support surface 22 is sloped, i.e., when the vehicle is resting on one or the other end face, as shown in FIG. 6B. If the vehicle center of mass is offset from the geometric center, a third gravitationally stable state is possible, as shown in FIG. 6C.

If in contrast the center of mass 61 is offset from the geometric center as shown, the cylindrical embodiment will have an additional gravitationally stable state on its cylindrical surface on a sloped underlying surface, as shown in FIG. 6A. In this gravitationally stable state, the vehicle center of mass is directly above the line of contact with the underlying surface, such that there is zero net torque acting to rotate the vehicle. The maximum slope angle where this is feasible is determined by the mass center offset from the geometric center. As would be obvious to those skilled in the art, there is an essentially unlimited number of other surfaces of revolution (i.e., with circular cross sections) that could be employed for the vehicle outer support surface, including spheres, cones and ellipsoids, sections of spheres, cones and ellipsoids, as well as combinations of surfaces of revolution with different shapes and radii, depending on the needs of the application.

In normal operation, the embodiment shown in FIGS. 6A-6C would displace itself along the underlying surface 22 by rolling on a circumferential portion of the vehicle's outer surface of revolution. If the rolling motion is produced by CMG torque alone, this torque will necessarily be discontinuous because of the need to periodically reset the CMG spin vectors to the neutral state, as described previously. The embodiment shown in FIGS. 6A-6C could, with sufficient CMG torque, also displace itself along the underlying surface 22 by rotating about an axis orthogonal to the axis of the surface of revolution in a tumbling motion. In addition to the rolling or tumbling motion employed to displace itself along the underlying surface 22, the embodiment can also change its orientation relative to the direction of travel (i.e., its heading) by employing CMG torque about an axis substantially normal to underlying surface 22 to pivot the vehicle relative to the surface. Per the previous discussion regarding the embodiment of FIGS. 5A-5C, production of torque about the yaw axis of the FIGS. 6A-6C embodiment requires that plurality of CMGs 3 has an orientation that supports generation of an effective yaw torque vector component at the time that a heading change is desired.

It is noted that a spherical vehicle with center of mass located at the geometric center of the sphere cannot be gravitationally stable indefinitely on a sloped underlying surface. Furthermore, a spherical vehicle with its center of mass offset from the sphere geometric center would have only one gravitationally stable orientation on a sloped underlying surface, unlike all of the illustrated embodiments of the present invention, which have a plurality of gravitationally stable states on a sloped underlying surface.

A Third Embodiment of the Present Invention

FIG. 7 shows a cutaway view of an embodiment of the present invention in which the vehicle is at rest on a sloped underlying support surface 22. The vehicle has a multisided (i.e., six sided in this case) outer surface 6. A center of gravity 62 is located within the outer surface. A multisided embodiment can have as many gravitationally stable states as the number of sides on a horizontal support surface and on slopes, with maximum slope angle determined by the vehicle surface geometry and the location of the vehicle center of mass. As would be obvious to those skilled in the art, a multisided embodiment could have any number of sides as dictated by the needs and constraints of the application. The embodiment can also displace itself along and pivot upon the underlying surface 22 in a manner analogous to that described above for the first embodiment. In the FIG. 7 embodiment, the outer surface 6 is a right rectangular prism, which is an especially useful multisided embodiment, because plurality of CMGs 3 can be arranged to always produce resultant torques in directions normal to the rectangular faces for maximum effectiveness and utility, regardless of the vehicle orientation.

A Fourth Embodiment of the Present Invention

FIG. 8 shows a cutaway view of a fourth embodiment of the present invention at rest on sloped underlying support surface 22. The vehicle includes a driven support surface incorporating one or more driven wheels 8. A center of gravity 64 is located within the vehicle. This embodiment can propel itself along the underlying surface 22 by means of the driven wheels 8, which are coupled to a suitable motor 102. In variations, one or more of the wheels can be locked to prevent rotation giving this embodiment at least four gravitationally stable states on a horizontal or sloped underlying support surface, including resting on its top or bottom or resting on either side. Vehicle geometry and the location of the center of mass determine the maximum slope angle. The plurality of single gimbal CMGs 3 attached to internal element 2 can be employed to generate resultant torques producing a sidewise or endwise rollover of the vehicle from one gravitationally stable state to another, as well as to pivot the vehicle about its yaw axis to change heading. Alternatively, some or all of the wheels may be steerable to effect changes in vehicle heading. As in the preceding embodiments, the CMG spin vectors must periodically be reset to or toward the neutral state. In this embodiment, the plurality of CMGs 3 can be arranged to always produce resultant torques in directions normal to the vehicle roll, pitch and/or yaw axes for maximum effectiveness, regardless of the vehicle orientation. The resultant roll torque vector produced by plurality of CMGs 3 can, for example, be used to right the FIG. 8 vehicle embodiment should it overturn. In addition, the resultant pitching torque can be used to pitch the front or rear of the vehicle up to perform a variety of useful maneuvers, including, for example, balancing on one end, and surmounting one or more step obstacles.

A Fifth Embodiment of the Present Invention

FIG. 9 shows a cutaway view of a fifth embodiment of the present invention at rest on a sloped underlying support surface 22, wherein the driven support surface includes at least one flexible track 10 trained over a pair of wheels 11, at least one of which drives flexible track 10. A motor 102 is typically provided to drive the wheels. A center of gravity 63 is located within the vehicle. This embodiment can propel itself along the underlying surface 22 by means of the driven flexible track 10. One variation of this embodiment incorporates only a single track as the external support surface wherein the yaw torque from the CMGs 3 is employed to change vehicle heading. Another variation of this embodiment incorporates two parallel tracks, one on either side of the vehicle, wherein changes in vehicle heading may also be effected by conventional skid steering. In all other important respects, the discussion above regarding the fourth embodiment applies to this embodiment.

A Sixth Embodiment of the Present Invention

FIG. 10 shows a cutaway view of a sixth embodiment of the present invention at rest on underlying support surface 22, and in which the device outer surface 15 is a driven surface. In this embodiment, surface 15 is driven by a pendulum drive mass-shifting drive system. In FIG. 10, the pendulum is comprised of internal element 16 together with, among other components, plurality of single gimbal CMGs 3. Internal element 16 is disposed to rotate continuously about transverse axis 20, which is disposed to impart rotation to outer surface 15 about axis 20. The overall center of mass of the vehicle is located at 18 most importantly spaced from the transverse axis. Drive mechanism 19 is attached to element 16 and incorporates torque transmitting means such as gears, belt and pulley, etc. to rotate chassis element 16 about axis 20. To propel the vehicle further up the slope shown in FIG. 10, drive mechanism 19 rotates element 16 to move center of mass 18 in front of the vehicle's most forward contact point 21 with the underlying surface 22 to produce a gravity-induced torque sufficient to rotate the vehicle forward about contact point 21. In normal operation, element 16 rotates forward or backward no more than about 90 degrees. For surmounting obstacles and climbing steeper inclines, plurality of CMGs 3 produce a resultant torque vector parallel to axis 20 to supplement the gravity-induced torque provided by the pendulum mass-shifting drive. Plurality of CMGs 3 can also be used independently of the pendulum mass-shifting drive. In addition, plurality of CMGs 3 can produce a resultant torque vector substantially parallel to a line drawn from center of mass 18 orthogonal to axis 20. When the pendulum is rotated so that center of mass 18 lies on a line orthogonal to both axis 20 and underlying surface 22, this resultant torque vector produces torque most effectively to change the vehicle heading. When element 16 is rotated to other angles, this resultant torque vector produces torque about both the vehicle yaw axis and the vehicle roll axis. Therefore, for changing vehicle heading, chassis element 16 is most advantageously oriented to produce mainly yaw torque as described above. In the embodiment shown in FIG. 10, outer surface 15 is an irregular surface providing a plurality of gravitationally stable states on horizontal or sloped underlying support surfaces. All of the motions described above regarding the FIG. 10 embodiment could be provided by, for example, a pair of single gimbal CMGs arranged as shown in FIGS. 4A-4B.

A Seventh Embodiment of the Present Invention

FIG. 11 shows a cutaway view of a seventh embodiment of the present invention at rest on underlying support surface 22, and in which the outer surface 25 is a driven surface. A circular/cylindrical surface 33 is attached to and forms a gear or track inside the irregular or multisided outer surface 25. In this embodiment, circular/cylindrical surface 33 is driven by what is known in the art as a "hamster wheel" mass-shifting drive system, comprised of element 26 together with, among other components, plurality of single gimbal CMGs 3. This mass-shifting embodiment functions substantially identically to the pendulum drive embodiment of FIG. 10, with the following differences. Element 26 rotates freely around axis 28, and drive mechanism 27 employs rotational drive element 31, which may be a driven friction wheel or gear or similar component engaging the circular surface, gear or track 33 to propel the vehicle forwardly or rearwardly. To propel the vehicle further up the slope shown in FIG. 11, drive element 31 is driven by mechanism 27 so as to move center of mass 29 in front of the vehicle's most forward contact point 30 with the underlying surface 22 to produce a gravity-induced torque sufficient to rotate the vehicle forward about contact point 30. All other aspects of this embodiment are the same as described for the FIG. 10 embodiment, including changing heading by means of yaw torque produced by plurality of CMGs 3. All of the motions describe above regarding the FIG. 11 embodiment could be provided by, for example, a pair of single gimbal CMGs arranged as shown in FIGS. 4A-4B.

An Eighth Embodiment of the Present Invention

FIG. 12 shows a cutaway view of an eighth embodiment of the present invention in which the outer support surface 41 is a six sided surface, such that a cross-section of outer support surface 41, taken orthogonal to transverse axis 46, is substantially a square. Transverse axis 46 is advantageously located substantially at the center of the square. The device further includes a pendulum mass-shifting system, comprised of element 43 together with, among other components, plurality of single gimbal CMGs 3. Element 43 is disposed to rotate continuously about transverse axis 46, which is disposed to impart rotation to outer surface 41 about axis 46. The overall center of mass of the device is located at 45. Drive mechanism 44 is attached to element 43 and incorporates torque transmitting means such as gears, belt and pulley, etc. to rotate element 43 about axis 46. To propel the device to the left along underlying surface 22, the device must roll over about the edge indicated by 40. In this embodiment, it is clear that when the device rests stably on underlying surface 22, it is not possible to move the device center of mass 45 ahead of the forward-most contact point 40 of the device with underlying surface 22. However, element 43, can be rotated forward to minimize the gravity moment arm about contact point 40 associated with center of mass 45, as illustrated in FIG. 12. With center of mass 45 in this position, the gravity torque that must be overcome in order to roll the device over about edge 40 is at a minimum, and is given by the product of the device weight times the horizontal distance from the center of mass 45 to front edge 40. To effect rollover, this remaining gravity torque must be overcome by the resultant precession torque produced by plurality of single gimbal CMGs 3. Therefore, in this embodiment, the pendulum mass-shifting system may be considered to supplement the plurality of CMGs 3 in propelling the device along the underlying surface. By repeatedly rotating from one gravitationally stable state to another in the fashion described, the device may be made to travel along the underlying surface. To change the direction of progress along the underlying surface, the plurality of CMGS 3 may produce a resultant torque substantially orthogonal to surface 22 when the long axis of element 43 is substantially orthogonal to surface 22, such that the device pivots on underlying surface 22 to change heading. In addition, plurality of CMGs 3 may be used to produce resultant torque to roll the device over in a direction orthogonal to the direction addressed by mass-shifting, as follows. It is noted that with the long axis of element 43 aligned substantially with the slope angle, torque parallel to the long axis of element 43 may be used to roll the device over about an edge parallel to that axis (i.e, into or out of the plane of the figure). However, the gravity torque that must be overcome would not be reduced by means of mass shifting as previously described, because the mass would not be shifted toward the direction of travel as before. All of the motions describe above regarding the FIG. 12 embodiment could be provided by, for example, a pair of single gimbal CMGs arranged as shown in FIGS. 4A-4B.

Methods of Use of Embodiments of the Present Invention

As previously discussed, most vehicles employing mass-shifting drive have outer surfaces that are surfaces of revolution, with the most common being substantially a sphere or circular cylinder for the most effective implementation of rolling locomotion. However, embodiments with irregular or multisided surfaces may have important attributes (including, but not limited to, multiple gravitationally stable states) of value in military, law enforcement and homeland security applications in which the device or vehicle, incorporating cameras and other sensors, may be configured to resemble an object that would not look out of place in a particular environment. For example, in a military setting where small boulders are common, an embodiment of the invention could be configured to look like a small boulder. Artificial light weight boulders are commercially available for use in landscaping, and similar devices could incorporate an embodiment of the present invention that includes a plurality of CMGs, together with an internal mass-shifting drive system. Under suitable conditions, such as nighttime darkness, the boulder could roll under remote control or autonomously to a position among other boulders where it could serve as an observation post. It might also carry an explosive charge.

Similarly, embodiments of the present invention could be implemented as an oil drum or similar container. It might initially be standing on end and then be made to fall over in a controlled fashion onto its cylindrical surface. It is understood that the CMGs can be used to overturn an object like an oil drum by rotating it about a corner, and then having it fall slowly and controllably onto its cylindrical surface by applying CMG precession torque in the reverse direction. After the drum falls onto its cylindrical surface, it could roll to a new location, propelled by an internal mass-shifting drive, supplemented by a plurality of CMGs for overcoming obstacles or inclines. Steering could be accomplished by the application of yaw torque as previously discussed. At its final location, it could then stand back up on end among other oil drums, for example.

In yet another example, an embodiment of the present invention could be implemented in the form of a corrugated cardboard shipping container (e.g., a "FEDEX box") or similar roughly cubical article. Then by repeatedly rolling over about its edges, it could propel itself from one location to another. Steering could be by means of CMG-produced yaw torque, or by rolling over in an orthogonal direction. Any of these implementations could be realized with or without incorporating a mass-shifting drive means, depending on the needs and limitations of the application. The potential for adding rollover locomotion capability to normally immobile common objects is practically unlimited.

It will also be obvious that embodiments of the present invention, featuring a plurality of single gimbal CMGs for producing torque without pushing against something external to an object, is not limited to ground vehicles. For example, an object or vessel that floats on water could be made to stand up in the water by CMG produced torque. The vessel could be maintained in this orientation for a period of time, even though the vessel center of gravity is above the center of buoyancy. In this orientation, sensors and/or cameras located in the upper end of the vessel could operate from an elevated vantage point.

Figure 13A:
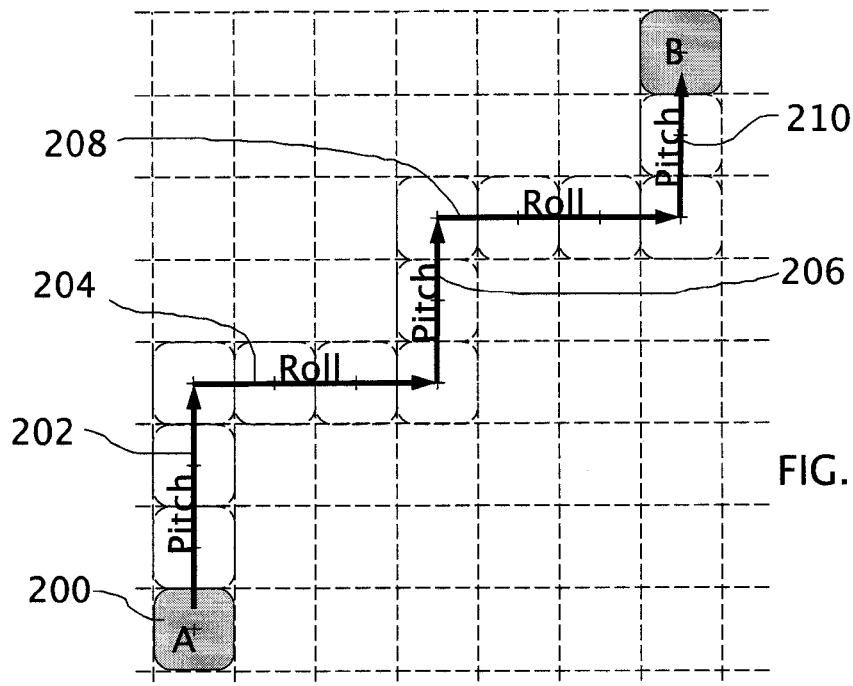
FIGS. 13A-13B show two ways in which a cubical vehicle incorporating a plurality of single gimbal CMGs can travel from point A to point B along an underlying surface according to one embodiment of the present invention.

FIG. 13A shows the top view of a cubical vehicle 200 traveling from point A to point B on an underlying surface by a sequence of rollovers about edges of the vehicle. The torque requirement imposed on the plurality of CMGs is minimized if the CMGs are mounted on a mass-shifting assembly, such as incorporated in the embodiment illustrated in FIG. 12. By shifting the vehicle center of gravity as far forward in the direction of travel as possible, the gravity torque resisting vehicle rollover about the forward edge is minimized. In the travel mode presented in FIG. 13A, the vehicle initially rolls over several times in a particular direction as indicated by line 202, then rolls over in an orthogonal direction as indicated by line 204. After each rollover, the vehicle would rest in a gravitationally stable state, and the plurality of CMGs could be reset to the neutral state in preparation for the next rollover. Since the travel mode shown in FIG. 13A requires vehicle rollover in two orthogonal directions, the cubical vehicle could potentially include a mass-shifting system capable of shifting the center of gravity in two orthogonal directions. However, a potentially simpler drive system would employ only a plurality of CMGs, capable of producing torque about at least two vehicle axes. As shown the vehicle continues along lines 206, 208 & 210 until reaching its destination.

Figure 13B:
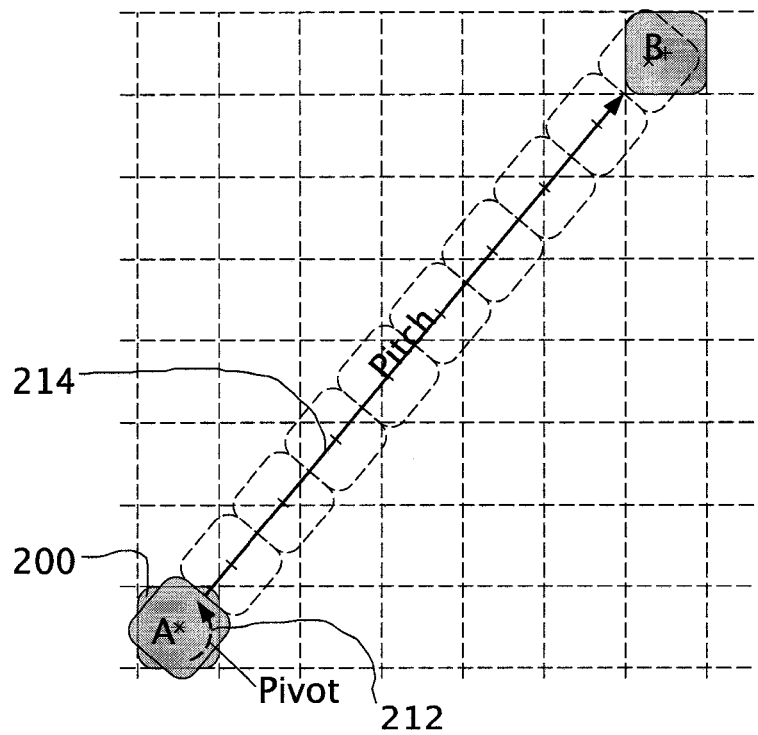

FIG. 13B shows the top view of a similar cubical vehicle 200 traveling from point A to point B by rolling over only on the same set of four vehicle faces. Steering is accomplished by pivoting the vehicle on the underlying surface by means of CMG-generated yaw torque as indicated by arcuate line 212. This mode of travel would most advantageously be implemented in a cubical vehicle incorporating a plurality of CMGs augmented by a mass-shifting system. The mass-shifting system, together with the plurality of CMGs would typically be employed to produce cube rollover along line 214. For steering, the mass-shifting system would position the vehicle center of gravity substantially directly below the vehicle geometric center, and the CMGs would produce torque about a vertical axis (i.e., yaw torque) to change the vehicle heading. A cubical vehicle employing only a plurality of CMGs could perform pivot steering also, but this approach would require that the orientation of the vehicle be provided to a remote operator or onboard control system, so that the plurality of CMGs could be commanded to produce torque about a currently vertical axis to effect the change in heading. It is clear that the torque produced by the plurality of CMGs of the embodiment make possible the locomotion of a cubical vehicle by internal means alone, which would not otherwise be possible.

Figure 14A:
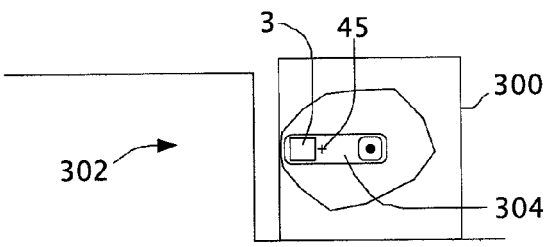
FIGS. 14A-14E show a cubical vehicle climbing a step nearly as high as the vehicle, driven by the torque produced by a plurality of single gimbal CMGs augmented by a pendulum mass-shifting system according to one embodiment of the present invention.
Figure 14B:
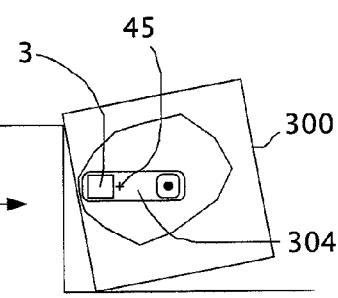
Figure 14C:
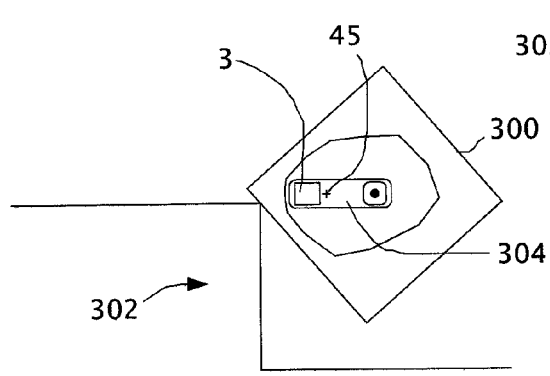
Figure 14D:
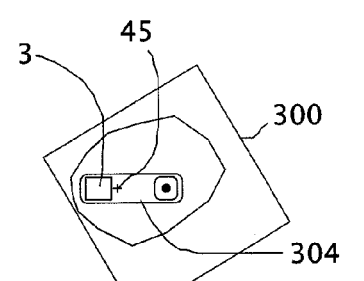
Figure 14E:
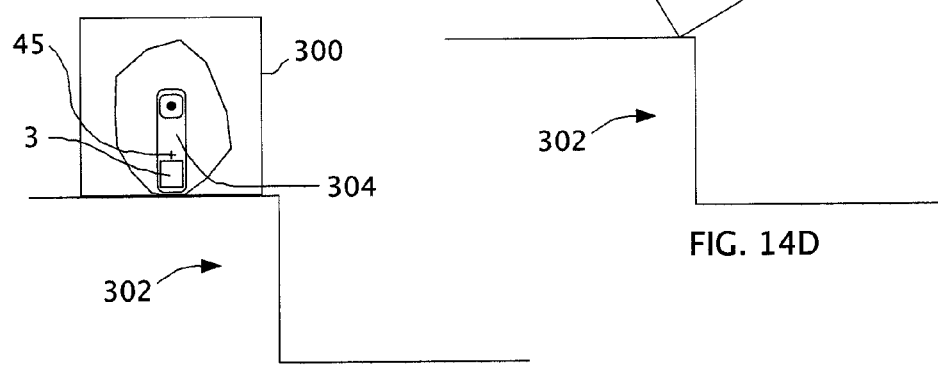

FIGS. 14A-14E is a cutaway view of a cubical vehicle 300 illustrating how it would climb a step obstacle 302 with height nearly equal to the height of the vehicle. For purposes of illustration, FIGS. 14A-14E show a vehicle incorporating a pendulum mass-shifting system, with a plurality of CMGs 3 mounted on the pendulum 304, as previously discussed above with reference to FIG. 12. Obviously, the vehicle could alternatively incorporate a hamster wheel or other type of mass shifting system. The vehicle center of gravity is indicated by point 45. FIG. 14A shows the vehicle initially close to the step, and the pendulum rotated fully forward toward the step to minimize the gravity torque that must be overcome. The vehicle could also start out against the step. In FIG. 14B, CMG torque has tipped the vehicle so it leans against the top corner of the step. In FIG. 14C, CMG torque has rotated the vehicle so that it lifts off the underlying surface and pivots about the step edge. It is assumed that the vehicle is prevented from slipping on the step edge by friction or by means of a feature on the vehicle surface that "engages" the step edge. FIG. 14D shows the vehicle rotated further by the CMG torque, such that the vehicle center of gravity is forward of the vehicle edge where it contacts the step surface. Once the vehicle has reached this position, it will continue to rotate due to gravity alone until it comes to rest on the step surface. The vehicle can be made to gently touch down on the step by rotating the pendulum downward to control the gravity torque and/or by employing CMG torque to offset the gravity torque. It is also obvious that the vehicle could be balanced on its edge in the FIG. 14D orientation by rotating the pendulum to position the vehicle center of gravity at its lowest point and by using either the CMG torque or the position of the pendulum to maintain balance. FIG. 14E shows the vehicle at rest on the step. The pendulum is shown such that the vehicle center of gravity is at its lowest point, but since the pendulum mass-shifting by itself cannot roll the cubical vehicle over, the pendulum could be placed in any convenient position. It is also clear that a cubical vehicle could be propelled to climb a step by means of CMG torque alone, without the augmentation of a mass-shifting system. However, as previously discussed, the plurality of CMGs would need to be capable of producing larger torque magnitudes.

Figure 15A:
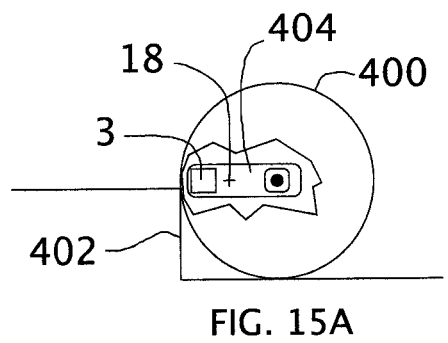
FIGS. 15A-15D show a cylindrical vehicle climbing a step with height equal to nearly half the vehicle diameter, driven by the torque produced by a plurality of single gimbal CMGs augmented by a pendulum mass-shifting system according to one embodiment of the present invention.
Figure 15B:
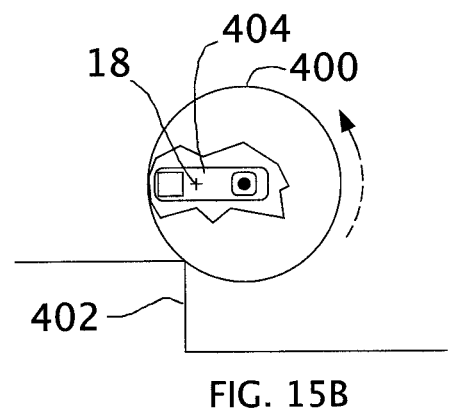
Figure 15C:
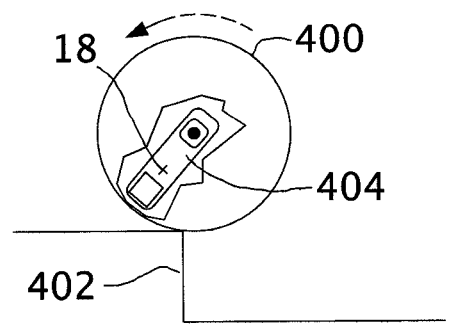
Figure 15D:
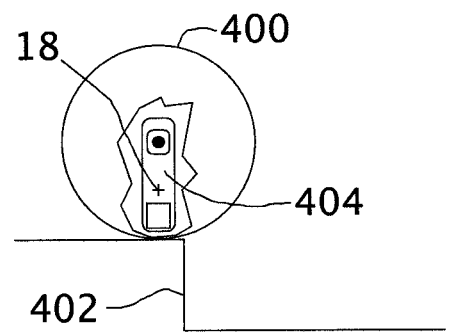

FIGS. 15A-15D show a cutaway view of a vehicle 400 with an outer surface of revolution, such as a sphere or a cylinder, illustrating how it would climb a step 402 with a height of nearly half the vehicle diameter. In FIG. 15A, the vehicle rests against the step corner. For purposes of illustration, the vehicle is shown with a pendulum mass-shifting system 404 on which is mounted the plurality of CMGs 3. Obviously, the vehicle could alternatively incorporate a hamster wheel or other type of mass shifting system. FIG. 15A also shows the pendulum swung all the way forward to minimize the gravity torque that must be overcome in order to surmount the step. In FIG. 15B, CMG torque has rotated the vehicle about the step edge, lifting the vehicle off the underlying surface. It is assumed that the vehicle is prevented from slipping on the step edge by friction or by means of a feature on the vehicle surface that "engages" the step edge. The pendulum is shown maintained in the forward-most position to continue to minimize the gravity torque that resists vehicle rotation to surmount the step. FIG. 15C shows the vehicle rotated to a position where the vehicle center of gravity is ahead of the contact point on the step surface. From this position on, gravity torque alone can roll the vehicle forward onto the step. The pendulum can lower the vehicle center of gravity to slow and then stop the forward rolling of the vehicle and maintain it in a gravitationally stable state. FIG. 15D shows the vehicle at rest on the step surface with its center of gravity at its lowest position directly over the contact point. As mentioned with regard to FIGS. 14A-14E, surmounting a step could be accomplished with CMG torque alone, but with the plurality of CMGs required to produce larger torque magnitudes.

Figure 16A:
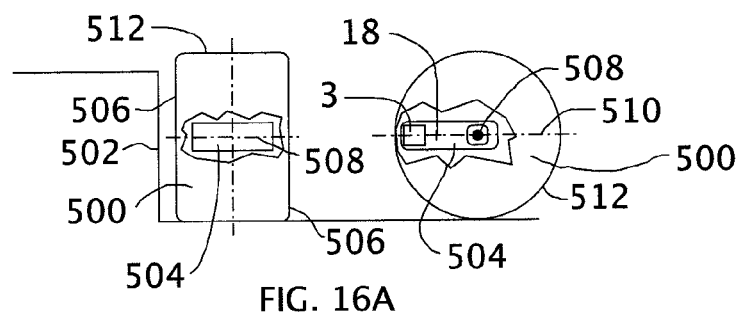
FIGS. 16A-16E show a cylindrical vehicle climbing a step with height equal to nearly the vehicle diameter, driven by the torque produced by a plurality of single gimbal CMGs augmented by a pendulum mass-shifting system according to one embodiment of the present invention.
Figure 16C:
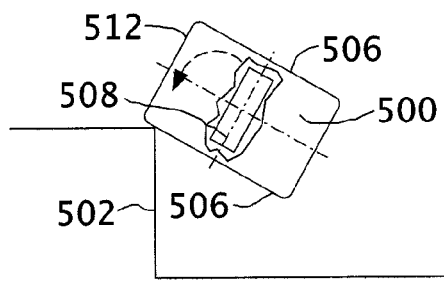
Figure 16B:
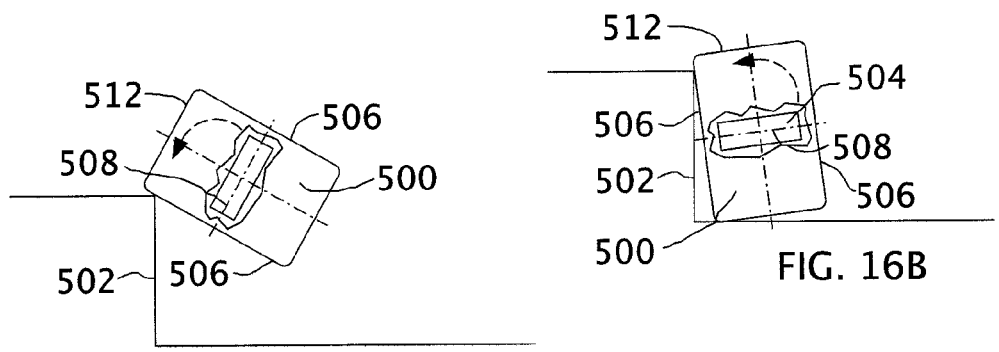
Figure 16D:
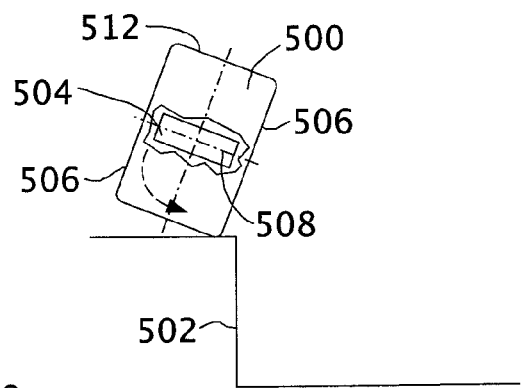
Figure 16E:
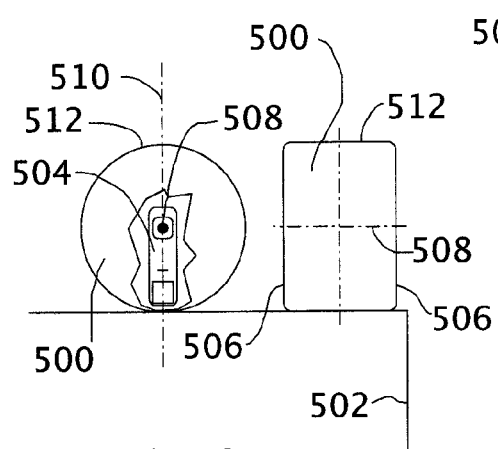

FIGS. 16A-16E show a cutaway view of a cylindrical vehicle 500, illustrating how it could surmount a step with height nearly equal to the vehicle diameter in a direction generally orthogonal to its normal direction of rotation about its annular side 512. In FIG. 16A, two views of the vehicle are provided: the vehicle end with a cutaway section showing the CMGs 3 and the mass shifting pendulum 504; and a side view with the vehicle end facing the step riser 502. FIGS. 16C & 16D illustrate the vehicle tumbling from end 506 to end 506. The vehicle includes the pendulum mass-shifting system 504 on which is mounted the plurality of single gimbals CMGs 3 capable of producing torque both parallel to the wheel cylinder axis 508 and parallel to the pendulum long axis 510. Other types of mass-shifting systems can be used to accomplish similar purposes. The left hand portion of FIG. 16A shows the vehicle 500, referred to hereinafter as a "fat wheel", with one end 506 nearly against the face of the step obstacle 502. The right hand portion of FIG. 16A shows the end 506 of the vehicle with a cutaway showing the pendulum rotated upwardly 90 degrees, a position that minimizes the gravity torque that must be overcome as the vehicle surmounts the step. Normally, rotating the pendulum upward 90 degrees would cause the vehicle to roll forward parallel to the step edge. However, it is anticipated that as the pendulum is raised, the plurality of CMGs 3 simultaneously produces torque about the pendulum long axis 510, which acts to rotate the vehicle about the step edge. In addition, the face of the flat end 506 could incorporate features to engage the step edge to minimize or prevent the tendency to roll forward. FIG. 16B shows the end 506 of the vehicle 500 just tipped against the step edge by the CMG torque parallel to the pendulum long axis. FIG. 16C shows the vehicle rotated such that it has lifted off the underlying surface. By keeping the pendulum in the 90 degree rotated position, the gravity torque that must be overcome is minimized throughout the climbing sequence. FIG. 16D shows the vehicle 500 rotated to a position where gravity torque alone can bring the fat wheel to rest on the step surface. The pendulum is rotated downwardly to lower the center of gravity 18 at the appropriate rate to limit rolling of the fat wheel on the step surface. FIG. 16E shows the vehicle 500 at rest on the step surface, with the pendulum 504 rotated to the lowest position, making the vehicle gravitationally stable on the step. While the initial raising of the pendulum and the actuation of CMG torque has to be tightly coordinated, the sequence can advantageously be performed under closed loop feedback control enabling a cylindrical vehicle to surmount obstacle heights approaching the wheel diameter, more than twice the relative height that any prior art cylindrical or spherical vehicle relying on mass-shifting drive alone for propulsion can surmount. A fat wheel cylindrical vehicle could surmount a step in the sideways manner described above by means of CMG torque alone, but the plurality of CMGs would be required to produce larger torque magnitudes, as previously described. It is also noted that should the fat wheel fall over onto one of the ends 506, it could right itself by employing the CMG torque parallel to the pendulum long axis 510 to rotate the vehicle from the gravitationally stable state on its side to the gravitationally stable state on its annular side 512.

Figure 17A:
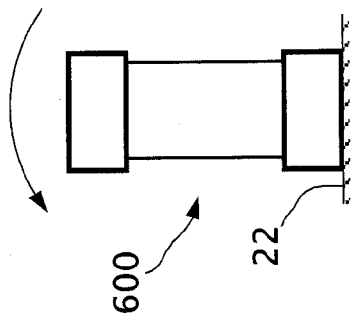
FIGS. 17A-17C illustrate the use of single gimbal CMG-generated torque to execute self-righting of a tracked vehicle that has rolled over onto its side according to one embodiment of the present invention.
Figure 17B:
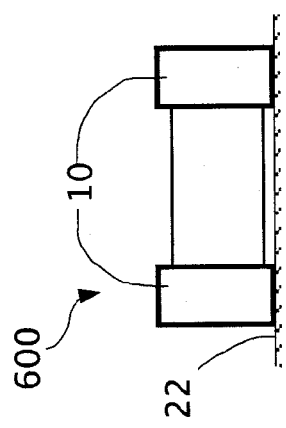
Figure 17C:
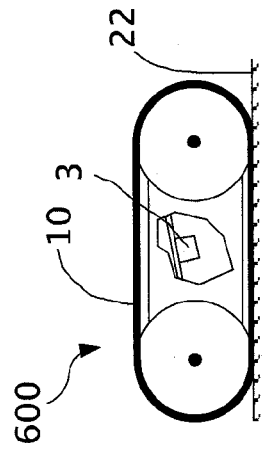

FIGS. 17A-17C show a tracked vehicle 600 executing a self-righting maneuver by utilizing CMG-generated roll torque. FIG. 17A shows a cutaway view of a tracked vehicle with driven tracks 10, and incorporating a plurality of single gimbal CMGs 3. FIG. 17B is a view of the vehicle from behind, showing it resting right-side-up on the underlying surface 22. FIG. 17C shows the vehicle rolled over onto its side in a gravitationally stable state on underlying surface 22. By application of CMG-generated torque about the vehicle roll axis, the vehicle can be righted without the need for external appendages or mechanisms, such that it returns to the right-side-up gravitationally stable orientation of FIG. 17B. Obviously, a sequence of rollovers about the roll axis could be executed to self-right a vehicle that has rolled over onto its top side. It is also obvious that these CMG-enabled self-righting maneuvers can be utilized by any type of vehicle, including all embodiments of the present invention disclosed herein.

Figure 18:
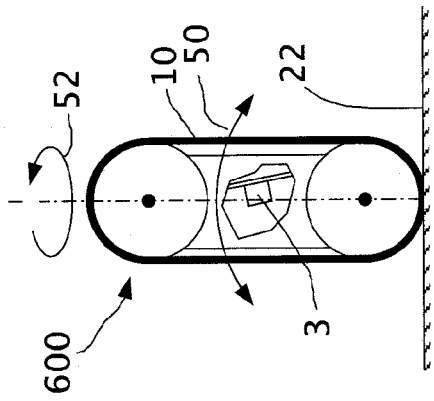
FIG. 18 shows a tracked vehicle utilizing single gimbal CMG-generated torque to balance on one end while traveling along an underlying surface according to one embodiment of the present invention.
Figure 19:
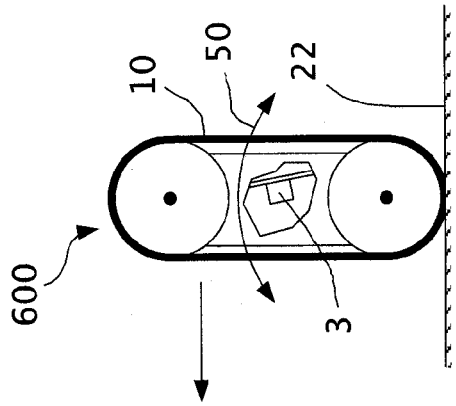
FIG. 19 shows a tracked vehicle utilizing single gimbal CMG-generated torque to balance on one end while pivoting about a vertical axis according to one embodiment of the present invention.

The ability of a vehicle 600 to rotate from one gravitationally stable state to another as illustrated, for example, in FIGS. 17A-17C also makes possible vehicle maneuvers like those shown in FIG. 18 and FIG. 19. Pitching torque produced by the plurality of CMGs 3 can be employed to pitch the vehicle up onto one end while the vehicle is either stationary or moving on its driven tracks as shown in FIG. 18. Once the vehicle is standing on one end, the CMG-generated pitching torque may be further employed to continue to balance the vehicle on its end as suggested by double ended arrow 50. The vehicle can remain in one spot on the underlying support surface 22 or the vehicle may be propelled along the surface by tracks 10. Continuous balancing on one end may advantageously be implemented by means of an onboard closed loop feedback control system utilizing a computer controller together with an inertial measurement unit that provides vehicle orientation data to the computer controller. The computer controller sends appropriate commands to the CMG tilt actuators to produce pitching torque as needed to maintain vehicle balance. Pitching a vehicle up onto one end may be advantageous for raising onboard sensors or cameras to an elevated vantage point. It is obvious that these CMG-enabled pitching up and balancing maneuvers can be utilized by any type of vehicle, including all embodiments of the present invention disclosed herein.

FIG. 19 shows a cutaway view of the tracked vehicle 600 with driven tracks 10, and incorporating a plurality of single gimbal CMGs 3. As described above, pitching torque produced by the plurality of CMGs 3 can be employed to pitch the vehicle up onto one end. Once the vehicle is standing on one end, the CMG-generated pitching torque may be further employed to continue to balance the vehicle on its end as suggested by double ended arrow 50. In the maneuver illustrated in FIG. 19, the tracks may be driven in opposite directions to pivot the vehicle as suggested by arrow 52 about a vertical axis, while CMG-generated pitching torque continues to balance the vehicle on its end as suggested by double ended arrow 50. Pivoting the vehicle while it is balanced on one end may be advantageous for panning an onboard camera horizontally. It is obvious that these CMG-enabled pitching up, balancing and pivoting maneuvers can be utilized by any type of vehicle, including all embodiments of the present invention disclosed herein.

FIGS. 20A-20E illustrate a first method by which the tracked vehicle 600 can surmount a step by utilizing CMG-generated pitching torque. FIG. 20A shows the tracked vehicle with driven tracks 10, and incorporating a plurality of single gimbal CMGs 3, either moving or stationary on underlying surface 22, near the step 602. FIG. 20B shows the front end of the vehicle pitched upward by CMG-generated pitching torque, while the vehicle simultaneously moves toward the step. FIG. 20C shows the vehicle with its front end pitched up high enough for the vehicle's tracks to engage the upper edge of the step. The maneuver must be executed such that the vehicle tracks contact the upper step edge before the CMGs producing pitching torque must be reset to or toward the neutral state. In FIG. 20D, CMG-generated pitching torque in the opposite direction lifts the rear of the vehicle off the underlying surface while the tracks simultaneously drive the vehicle forward. FIG. 20E shows the vehicle at rest on the step surface. It is obvious, that the sequence presented as method one may be repeated to climb a series of steps (i.e., stairs), if the vehicle length is compatible with the step depth.

Figure 21A:
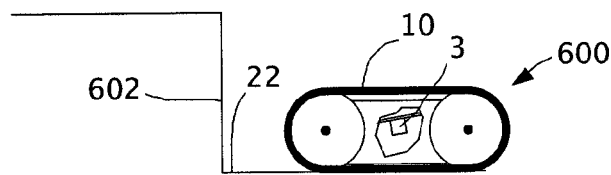
FIGS. 21A-21F illustrate a second method by which a tracked vehicle utilizing single gimbal CMG-generated torque can surmount a step according to one embodiment of the present invention.
Figure 21B:
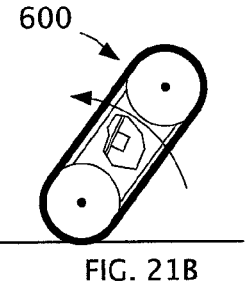
Figure 21C:
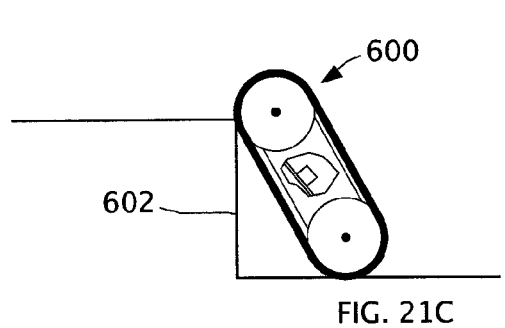
Figure 21D:
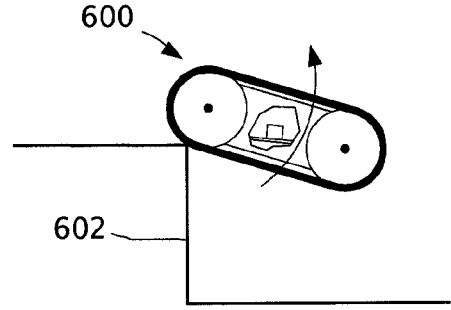
Figure 21E:
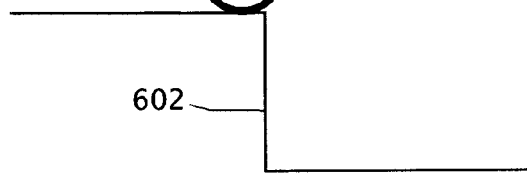
Figure 21F:
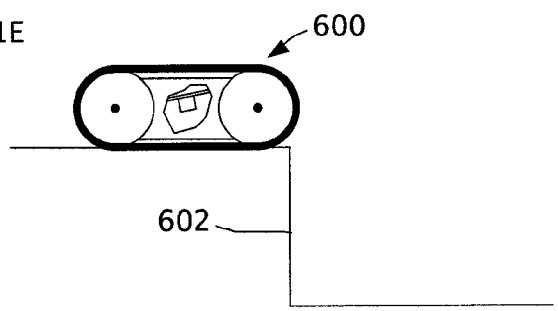

FIGS. 21A-21F illustrate a second method by which the tracked vehicle 600 can surmount a step by utilizing CMG-generated pitching torque. FIG. 21A shows the tracked vehicle with driven tracks 10, and incorporating a plurality of single gimbal CMGs 3, either moving or stationary on underlying surface 22, near the step 602. FIG. 21B shows the rear end of the vehicle pitched up by CMG-generated pitching torque. FIG. 21C shows the vehicle after the rear end has pitched all the way up and over until the tracks contact the step upper edge. This pitching over maneuver must be executed such that the vehicle tracks contact the upper step edge before the CMGs must be reset to or toward the neutral state. However, it is noted that once the vehicle's center of gravity has passed over the vehicle's contact region on the underlying surface during the pitching over, the CMGs producing pitching torque may be tilted in the opposite direction to ease the vehicle against the step edge while also resetting the CMGs toward the neutral state. In FIG. 21D, the CMGs again begin to pitch the vehicle up and over toward the step, during which the vehicle pivots about the step edge. FIG. 21E shows the vehicle continuing to pitch over in the same direction. FIG. 21F shows the vehicle at rest on the step, after completion of the maneuver. As in the first method described above, it is obvious, that the sequence presented as method two may be repeated to climb a series of steps (i.e., stairs), if the vehicle length is compatible with the step depth. It is also clear that method two for surmounting a step could also be executed by a wheeled vehicle, if the wheels can be locked (e.g., brakes applied) to prevent rotation during the pitching over maneuvers.

Figure 22A:
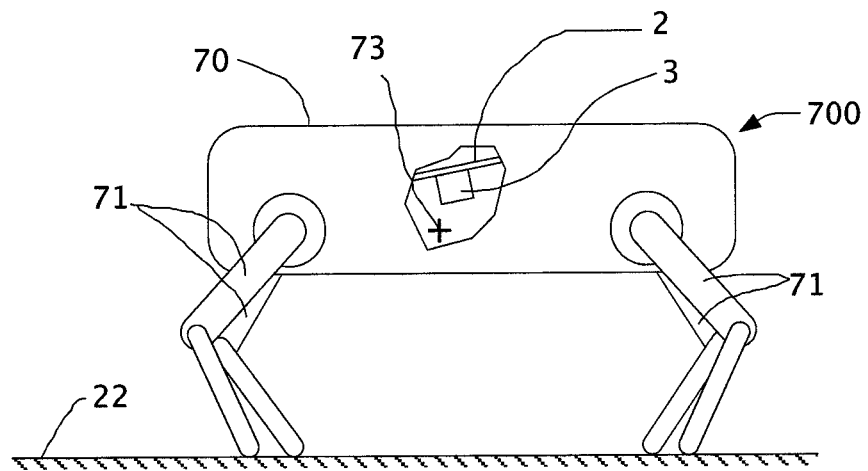
FIGS. 22A-22B show cutaway view of an embodiment of the subject device including a driven outer support surface comprising a plurality of legs, and further including a plurality of single gimbal CMGs attached to a chassis element, illustrating self-righting according to one embodiment of the present invention.
Figure 22B:
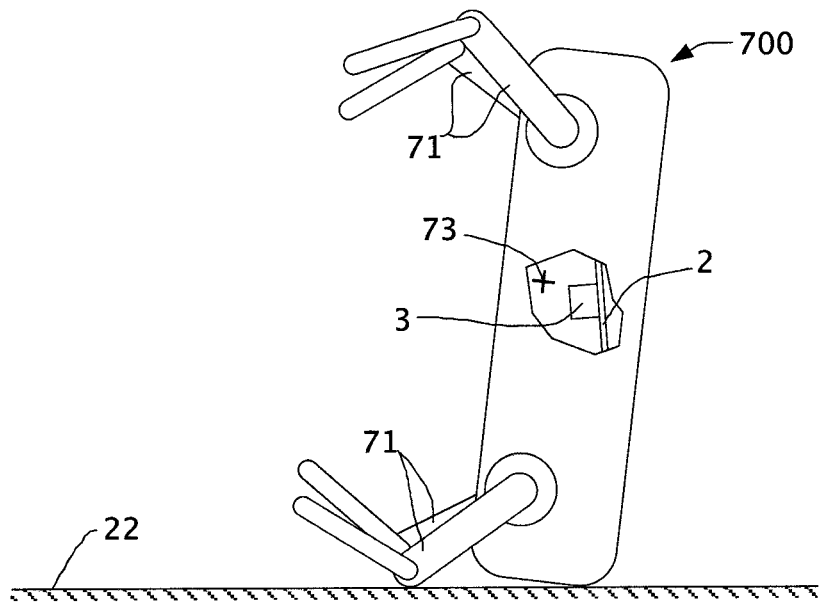
Figure 23A:
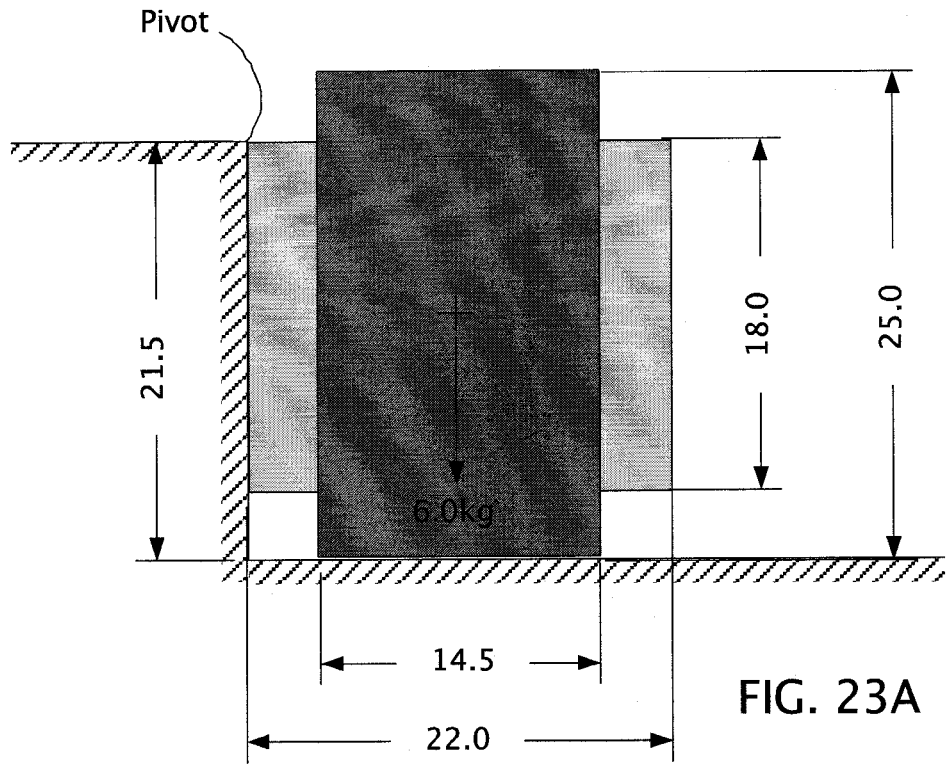
FIGS. 23A-23F present the results of an analysis of a prototype cylindrical vehicle surmounting a step nearly as high as the vehicle diameter in a sideways fashion according to one embodiment of the present invention.
Figure 23B:
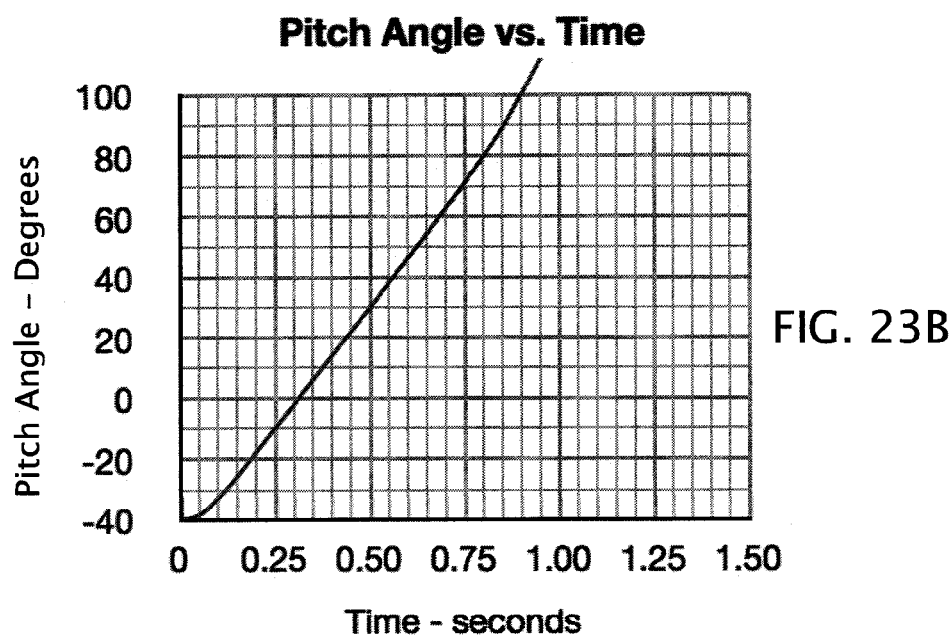

FIGS. 22A-22B show a legged vehicle 700 with outer surface 70 incorporating a plurality of single gimbal CMGs 3 attached to a chassis element 2. The embodiment illustrated in FIGS. 23A-23B is representative of remotely controlled or autonomous vehicles incorporating a plurality of driven legs 71 for locomotion. Vehicles incorporating two, four, six and more legs have been publicly demonstrated and are well known to those skilled in the art. If a legged vehicle falls over endwise (as suggested in FIG. 22B) or sidewise, recovering to a stable upright position is a difficult challenge. A plurality of CMGs incorporated into any legged vehicle can be utilized in conjunction with sensors and a computer controller, typically already utilized in most, if not all legged vehicles, to apply torques about the appropriate vehicle axis to aid in returning the vehicle to a stable upright orientation.

FIGS. 23A-23F present the results of an analysis of a prototype fat wheel cylindrical vehicle surmounting a step in a sideways fashion, closely following the sequence shown in FIGS. 16A-16E. As shown in FIGS. 16A-16E, the vehicle is assumed to incorporate a pendulum mass-shifting mechanism. For this example, it is further assumed that mounted on the pendulum is a pair of CMGs arranged in a skewed-pair configuration like that shown in FIGS. 4A-4B. The skew angle between the two tilt axes is assumed to be 90 degrees. FIG. 23A shows the vehicle initially up against the step. The vehicle comprises two concentric cylinders, with the inner cylinder having a diameter of 18 cm, and the outer cylinder having a diameter of 25 cm. The width of the inner cylinder is 22 cm and the width of the outer cylinder is 14.5 cm. The height of the step is 21.5 cm (86% of the vehicle diameter) and for purposes of the analysis, the vehicle is assumed to pivot where the top of the inner cylinder meets the step edge. The vehicle is assumed to weigh 6 kg. The angular momentum of each CMG is assumed to be 2.1 Nms. The equation of motion of the vehicle as it pivots about the step edge is:

$$\sum_{Pivot} \Gamma = I_{Vehicle} \frac{d^2\theta}{dt^2}$$

where $$\sum_{Pivot} \Gamma$$

is the sum of the torques acting on the vehicle about the pivot point, $I_{vehicle}$ is the moment of inertia of the vehicle about the pivot point, and $\theta$ is the pitch angle of the vehicle about the pivot point. There are two torques acting on the vehicle: the torque applied by the pair of CMGs as their spin axes are tilted, and the gravity torque. When expressions for these two torques are substituted into the equation of motion, it becomes:

$$2L\frac{d\gamma}{dt}\sin\left(\frac{\pi-b}{2}\right)\cos\gamma - WR\cos\theta = I_{Vehicle}\frac{d^2\theta}{dt^2}$$

where L is the angular momentum of each CMG, $\gamma$ is the CMG rotor tilt angle, b is the skew angle of the CMG skewed-pair, W is the vehicle weight, and R is the moment arm associated with the gravity torque. Experience suggests that in performing a challenging maneuver such as the sideways step climbing, the CMG tilt motors will need to produce their maximum torque at any tilt rate, leading to the constraint that the CMG rotor tilt should follow the torque-speed curve for the tilt motor. It is assumed that the motor torque-speed curve is a straight line with the stall torque and the no-load speed specified, such that the CMG tilt torque is given by:

$$\Gamma_t = L\frac{d\theta}{dt} = \Gamma_{Stall} - \frac{60\Gamma_{Stall}}{2\pi RPM_{No\_Load}}\frac{d\gamma}{dt}$$

Figure 23C:
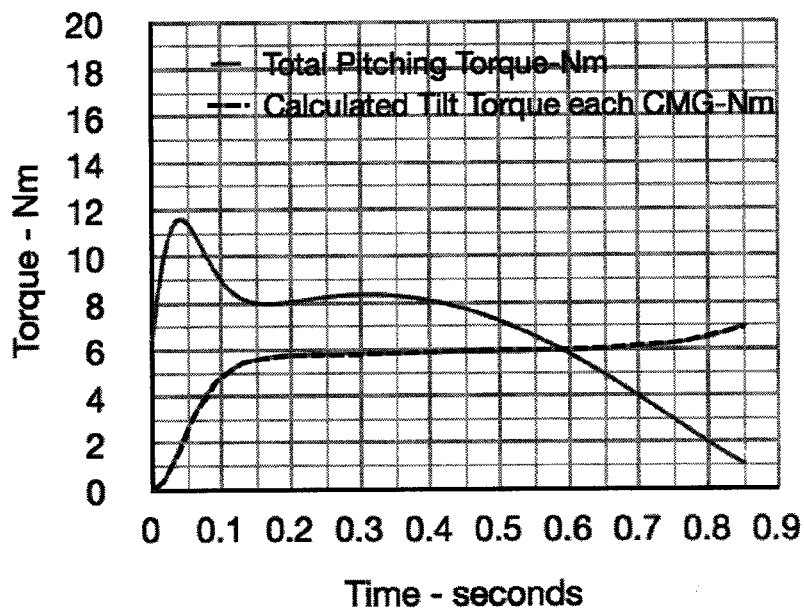
Figure 23D:
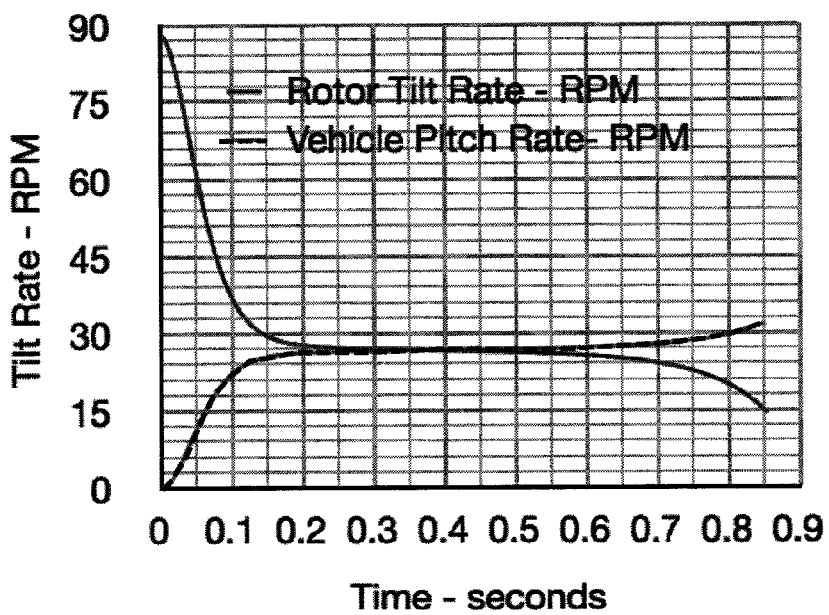
Figure 23E:
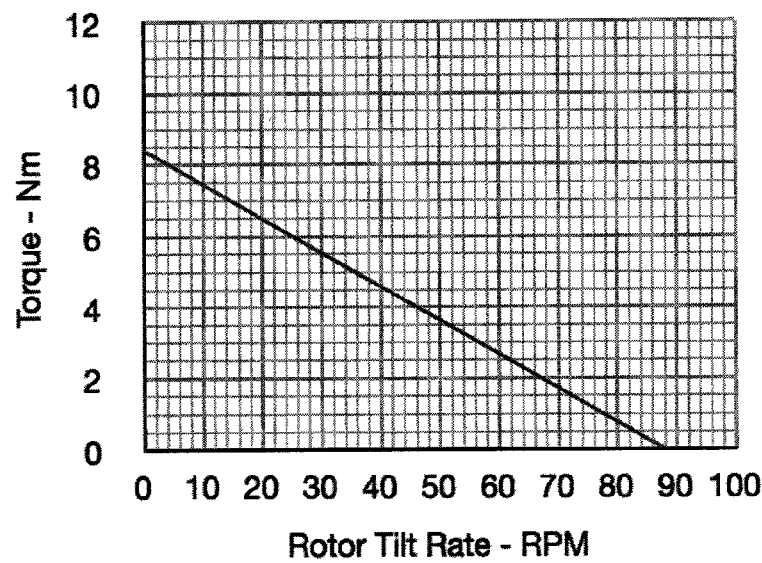
Figure 23F:
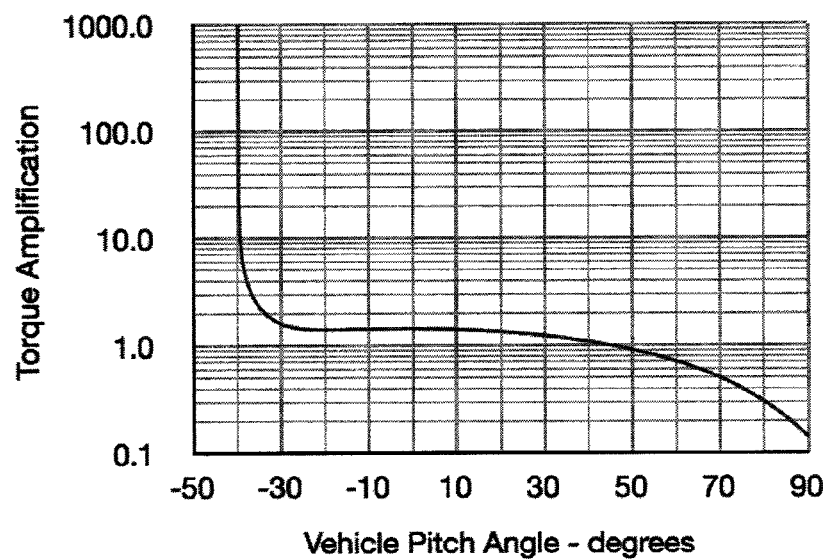

In this expression, L is the angular momentum in each CMG, $\Gamma_{Stall}$ is the tilt motor stall torque, and $RPM_{No\_Load}$ is the tilt motor no-load speed. It is noted that even though the CMGs are being tilted, the CMG rotor tilt torque is zero unless the vehicle pitch angle is actually changing. Solving the above expression for $$\frac{d\theta}{dt}$$

and substituting into the equation of motion, the equation of motion takes the form:

$$\frac{d\dot{\gamma}}{dt} = C_1\cos\theta - C_2\dot{\gamma}\cos\gamma$$

where $C_1$ and $C_2$ are constants comprised of the pertinent vehicle and CMG parameters, and the equation of motion is an ordinary, nonlinear, first order differential equation in the CMG rotor tilt rate $\dot{\gamma}$. In this example, the tilt motor stall torque was assumed to be 8.4 Nm, the no-load speed was 88 RPM, and the vehicle mass was 6 kg. The vehicle moment of inertia about the pivot point was calculated to be 0.156 kg-m$^2$, based on estimates of pendulum mass and configuration and vehicle shell characteristics. The non-linear equation of motion was solved numerically by means of a 4th order Runge-Kutta routine. A sampling of results is presented in FIGS. 23B-23F. FIG. 23B is a plot of vehicle pitch angle versus time, where the pitch angle is the angle between a horizontal line and the gravity moment arm R defined above. The example assumes the pendulum has initially been swung upward 90 degrees, as discussed with regard to FIGS. 16A-16E. FIG. 23B shows that the pitch angle surpasses 90 degrees at about 0.85 second, at which time the vehicle center of gravity is passing over the pivot point. This indicates that the fat wheel vehicle has successfully surmounted the step in a sideways fashion. FIG. 23C is a plot of the calculated CMG-generated pitching torque and the calculated CMG spin axis tilt torque versus time. This plot shows that the vehicle pitching torque is greater than the CMG tilt torque during most of the maneuver, and the torque amplification factor is initially very large. FIG. 23D is a plot of CMG tilt rate and vehicle pitching rate versus time showing that the CMG tilt rate is initially at the motor no-load speed, as the vehicle begins to pitch up. After about 0.25 second, the two rates become approximately equal, and they continue this way until about 0.50 second, after which the CMG tilt rate diminishes until the maneuver is completed. FIG. 23E is a plot of calculated CMG tilt torque versus CMG tilt rate, which confirms that the tilt motors do in fact follow the straight line motor torque-speed curve as required. FIG. 23F is a plot of torque amplification versus vehicle rotation angle showing that the torque amplification is initially extremely high as the fat wheel vehicle begins to pitch up while pivoting against the step edge. The amplification factor drops off rapidly, but is larger than unity throughout much of the maneuver of surmounting the step sideways, illustrating the advantage of using single gimbal CMGs for producing torque. This example, based on an actual prototype design for a fat wheel cylindrical vehicle, demonstrates the remarkable, previously infeasible maneuvers enabled by the subject invention.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A mobile device for movement on an underlying support surface, the device comprising:
    a shell including an outer support surface and defining a cavity;
    a center of gravity located within the cavity;
    a mass shifting mechanism located within the cavity, the mass shifting mechanism adapted to selectively move the center of gravity; and
    a plurality of control moment gyroscopes disposed within the cavity, the plurality of control moment gyroscopes having mutually non-parallel tilt axes and being disposed to selectively apply resultant torques to said mobile device, the selectable resultant torques including torques substantially perpendicular to the underlying support surface.

2. The device in claim 1, wherein said outer support surface is substantially a surface of revolution.

3. The device of claim 2, wherein the outer support surface comprises a cylinder.

4. The device of claim 1, wherein said outer support surface is multisided.

5. The device of claim 1 wherein the mass shifting mechanism comprises a pendulum, the pendulum including an arm and a drive mechanism for rotating the arm relative to the shell to shift the center of gravity.

6. The device of claim 5, wherein plurality of control moment gyroscopes are mounted on the arm.

7. The device of claim 6, wherein the control moment gyroscopes are each single gimble gyroscopes.

8. The device of claim 6, wherein the shell includes at least three distinct exterior sides.

9. The device of claim 1, wherein the plurality of control moment gyroscopes are configurable to apply a selectable resultant torque to said mobile device facilitating rotation of the device from one gravitationally stable state to another selectable gravitationally stable state on the underlying support surface while the mass shifting mechanism is positioned to maintain said center of gravity in a fixed position relative to said shell.

10. The device of claim 1, wherein said torques substantially perpendicular to an underlying support surface produce pivotal movement of said mobile device about an axis substantially perpendicular to said underlying support surface.

11. A method of climbing an obstacle having a generally vertical face using the device of claim 1, the method comprising:
- maneuvering the device placing it next to the generally vertical face;
- using the mass shifting mechanism, selectively shifting the center of gravity as close as possible to the obstacle; and
- using the plurality of control moment gyroscopes, applying a torque to the device, causing it to rotate about its point of contact with the obstacle so as to effect surmounting the obstacle.

12. A mobile device for movement on an underlying ground surface, the device comprising:
- a shell including an outer support surface and defining a cavity;
- a center of gravity located within the cavity;
- a mass shifting pendulum located within the cavity, the mass shifting pendulum having an arm and a drive mechanism for rotating and positioning the arm relative to the shell to shift the center of gravity; and
- a plurality of single-gimbled control moment gyroscopes disposed within the cavity and mounted on the arm, the plurality of control moment gyroscopes having mutually non-parallel tilt axes; said plurality of control moment gyroscopes disposed to apply selectable resultant torques to said mobile device.

13. The mobile device of claim 12, wherein the outer support surface comprises a cylinder.

14. The mobile device of claim 12, wherein said outer support surface is multisided.

* * * * *